US009286522B2

(12) United States Patent
Stein et al.

(10) Patent No.: US 9,286,522 B2
(45) Date of Patent: *Mar. 15, 2016

(54) STEREO ASSIST WITH ROLLING SHUTTERS

(71) Applicant: Mobileye Vision Technologies Ltd., Jerusalem (IL)

(72) Inventors: Gideon Stein, Jerusalem (IL); Efim Belman, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/534,750

(22) Filed: Nov. 6, 2014

(65) Prior Publication Data

US 2015/0062304 A1   Mar. 5, 2015

Related U.S. Application Data

(63) Continuation of application No. 14/156,096, filed on Jan. 15, 2014, now Pat. No. 8,908,041.

(60) Provisional application No. 61/752,515, filed on Jan. 15, 2013, provisional application No. 61/761,724, filed on Feb. 7, 2013.

(51) Int. Cl.
*G06K 9/00* (2006.01)
*H04N 13/02* (2006.01)
(Continued)

(52) U.S. Cl.
CPC ............ *G06K 9/00791* (2013.01); *H04N 5/232* (2013.01); *H04N 5/247* (2013.01); *H04N 13/025* (2013.01); *H04N 13/0282* (2013.01); *H04N 13/0296* (2013.01)

(58) Field of Classification Search
CPC ............ G06K 9/00791; H04N 13/025; H04N 13/0296; H04N 5/247
USPC ............................ 348/47, 111–118, 142–160
See application file for complete search history.

(56) References Cited

U.S. PATENT DOCUMENTS 7,112,774 B2   9/2006   Baer
7,486,803 B2   2/2009   Camus
(Continued)

FOREIGN PATENT DOCUMENTS

WO   WO 2010/136344   12/2010
WO   WO 2012/076274   6/2012
(Continued)

OTHER PUBLICATIONS

Zilly et al., "Depth Based Content Creation Targeting Stereoscopic and Auto-Stereoscopic Displays," Fraunhofer Heinrich Hertz Institute, Germany (2012) (8 pages).

(Continued)

*Primary Examiner* — Behrooz Senfi
(74) *Attorney, Agent, or Firm* — Finnegan, Henderson, Farabow, Garrett & Dunner LLP

(57) ABSTRACT

An imaging system for a vehicle may include a first image capture device having a first field of view and configured to acquire a first image relative to a scene associated with the vehicle, the first image being acquired as a first series of image scan lines captured using a rolling shutter. The imaging system may also include a second image capture device having a second field of view different from the first field of view and that at least partially overlaps the first field of view, the second image capture device being configured to acquire a second image relative to the scene associated with the vehicle, the second image being acquired as a second series of Image scan lines captured using a rolling shutter. As a result of overlap between the first field of view and the second field of view, a first overlap portion of the first image corresponds with a second overlap portion of the second image. The first image capture device has a first scan rate associated with acquisition of the first series of image scan lines that is different from a second scan rate associated with acquisition of the second series of image scan lines, such that the first image capture device acquires the first overlap portion of the first image over a period of time during which the second overlap portion of the second image is acquired.

19 Claims, 18 Drawing Sheets

(51) Int. Cl.
*H04N 5/247* (2006.01)
*H04N 5/232* (2006.01)

(56) References Cited

U.S. PATENT DOCUMENTS

| | | | |
|---|---|---|---|
| 7,817,187 | B2 | 10/2010 | Silsby et al. |
| 7,961,906 | B2 | 6/2011 | Ruedin |
| 8,330,796 | B2 | 12/2012 | Schmidt et al. |
| 8,358,359 | B2 | 1/2013 | Baker et al. |
| 8,378,851 | B2 | 2/2013 | Stein et al. |
| 8,417,058 | B2 | 4/2013 | Tardif |
| 8,456,517 | B2 | 6/2013 | Spektor et al. |
| 8,497,932 | B2 | 7/2013 | Morimoto |
| 8,908,041 | B2 * | 12/2014 | Stein et al. ............. 348/148 |
| 2005/0077450 | A1 | 4/2005 | Baer |
| 2005/0078185 | A1 | 4/2005 | Suzuki et al. |
| 2009/0201361 | A1 | 8/2009 | Lyon et al. |
| 2010/0253784 | A1 | 10/2010 | Oleg |
| 2011/0222757 | A1 | 9/2011 | Yeatman et al. |
| 2011/0242342 | A1 | 10/2011 | Goma et al. |
| 2011/0285982 | A1 | 11/2011 | Breed |
| 2013/0010084 | A1 | 1/2013 | Hatano |
| 2013/0101176 | A1 | 4/2013 | Park et al. |
| 2013/0141579 | A1 | 6/2013 | Schofield et al. |
| 2013/0147921 | A1 | 6/2013 | Mor et al. |
| 2013/0250046 | A1 | 9/2013 | Schofield et al. |

FOREIGN PATENT DOCUMENTS

| | | |
|---|---|---|
| WO | WO 2013/012335 | 1/2013 |
| WO | WO 2013/029606 | 3/2013 |

OTHER PUBLICATIONS

Winkler et al., "Stereo/Multiview Picture Quality: Overview and Recent Advances," University of Illinois at Urbana—Champaign, Elsevier (2013) (16 pages).
Llorca et al., "Stereo Regions-of-Interest Selection for Pedestrian Protection: A Survey," University of Alcala, Madrid, Spain, Elsevier (2012) (12 pages).
Heinzle et al., "Computational Stereo Camera System with Programmable Control Loop," Disney Research, Zurich (2011) (10 pages).
Gu et al., "Coded Rolling Shutter Photography; Flexible Space-Time Sampling," Columbia University (2010) (8 pages).
Darms et al., "Data Fusion Strategies in Advanced Driver Assistance Systems," SAE International, (Oct. 2010) (8 pages).
Bradley et al., "Synchronization and Rolling Shutter Compensation for Consumer Video Camera Arrays," University of British Columbia (2009) (8 pages).
Tiemann et al., "Ein Beitrag zur Situationsanalyse im vorausschauenden Fu'Bgangerschutz," Universitat Duisburg—Essen, Germany (2012) (173 pages).
Communication from the International Search Authority entitled "Invitation to Pay Additional Fees and, Where Applicable, Protest Fee" and "Annex to From PCT/ISA/206, Communication Relating to the Results of the Partial International Search," dated Aug. 1, 2014 (8 pages).
Bennett Wilburn et al., "High Performance Imaging Using Large Camera Arrays," Association for Computing Machinery, Inc., vol. 24, No. 3 (2005) (12 pages).
Andrew Adams et al., "The Frankencamera: An Experimental Platform for Computational Photography," ACM Transactions on Graphics, vol. 29, No. 4, Article 29 (Jul. 2010) (12 pages).
International Search Report and Written Opinion in International Application No. PCT/IB2014/000582, Nov. 12, 2014 (15 pages).

* cited by examiner

STEREO ASSIST WITH ROLLING SHUTTERS

This application is a continuation of and claims priority from U.S. patent application Ser. No. 14/156,096, filed Jan. 15, 2014, which is a non-provisional of and claims priority from U.S. Provisional Application No. 61/752,515, filed Jan. 15, 2013, and U.S. Provisional Application No. 61/761,724, filed Feb. 7, 2013. Each aforementioned application is incorporated herein by reference in its entirety.

BACKGROUND

I. Technical Field

The present disclosure relates generally to camera imaging systems and more specifically to devices and techniques for capturing images in a rolling shutter, stereo image acquisition system that may be included on a vehicle.

II. Background Information

Camera based driver assistance systems for use in vehicles may include monocular object detection systems that rely primarily on a single camera to collect images. Because the images in these types of systems are captured from a single point of view, direct determination of distance to a target object can be challenging. Therefore, monocular object detection systems may rely upon estimation techniques to indirectly determine distances to a target object based on information about the object class and/or contextual information relative to the context of the object (e.g., aspects of a road plane on which the target object resides). In some cases, monocular systems may use pattern recognition to detect a specific object class prior to monocular range estimation.

Camera based driver assistance systems for use in vehicles may also include stereo systems that employ two cameras. In some systems, these cameras may be mounted side-by-side where epipolar lines are aligned with the horizontal image scan lines. Such a system may use a dense disparity map to create a 3D map of the environment. The system may then use this 3D representation for foreground and/or background segmentation, for instance, to find candidate regions for further processing. The system may also use the 3D representation to locate interesting objects or to estimate range and/or range-rate to detected objects. Such stereo systems may work well with close and medium range targets and in good weather, and may give depth maps on general targets. However, such stereo systems may experience difficulties during adverse weather conditions or where cluttered scenes exist. Additionally, these systems may have difficulty imaging objects at longer distances from the vehicle.

Some imaging systems, such as systems described in U.S. Pat. No. 7,786,898, may fuse information from both a monocular system and a stereo system. This type of system may include a primary camera responsible for target detection/selection and range estimation. A secondary camera may provide stereo-range on selected targets for purposes of target verification.

Some stereo systems may include an asymmetric configuration that may combine stereo-depth and monocular depth together. For instance, two asymmetric cameras (e.g., with different fields of view (FOV) and focal lengths) may be employed for independent applications. Additionally, image information from these cameras may be combined to provide stereo depth. For cameras with global shutters, such stereo processing may involve, among other things, cropping the wider FOV camera, smoothing and subsampling of images, and/or rectification in order to provide a matching image pair.

Recent generations of image sensors, including those that may be used in automotive sensors, may include a rolling shutter. Such a rolling shutter may introduce complications in stereo image processing, especially in asymmetric stereo applications that use cameras having different fields of view. For instance, if both a wide FOV camera and a narrow FOV camera are aimed at a common scene, then the narrow FOV camera may overlap with only a portion of the FOV of the wide FOV camera. If both cameras acquire images as a similar number of image scan lines acquired at a similar line scan rate, then the acquired image scan lines in the area of the overlap in the fields of view of the two cameras will lack synchronization. Such a lack of synchronization may introduce difficulties in determining a correspondence of image points in a first image from the wide FOV camera with image points in a second image from the narrow FOV camera, which can lead to significant inaccuracies object distance measurements.

SUMMARY

Consistent with disclosed embodiments, an imaging system for a vehicle is provided, the system comprising a first image capture device having a first field of view and configured to acquire a first image relative to a scene associated with the vehicle, the first image being acquired as a first series of image scan lines captured using a rolling shutter. The imaging system may also include a second image capture device having a second field of view different from the first field of view and that at least partially overlaps the first field of view, the second image capture device being configured to acquire a second image relative to the scene associated with the vehicle, the second image being acquired as a second series of image scan lines captured using a rolling shutter. As a result of overlap between the first field of view and the second field of view, a first overlap portion of the first image may correspond with a second overlap portion of the second image. The first image capture device may have a first scan rate associated with acquisition of the first series of image scan lines that may be different from a second scan rate associated with acquisition of the second series of image scan lines, such that the first image capture device acquires the first overlap portion of the first image over a period of time during which the second overlap portion of the second image is acquired.

Consistent with disclosed embodiments, a vehicle is disclosed, the vehicle including a body and an imaging system for a vehicle, the system comprising a first image capture device having a first field of view and configured to acquire a first image relative to a scene associated with the vehicle, the first image being acquired as a first series of image scan lines captured using a rolling shutter. The imaging system may also include a second image capture device having a second field of view different from the first field of view and that at least partially overlaps the first field of view, the second image capture device being configured to acquire a second image relative to the scene associated with the vehicle, the second image being acquired as a second series of image scan lines captured using a rolling shutter. As a result of overlap between the first field of view and the second field of view, a first overlap portion of the first image may correspond with a second overlap portion of the second image. The first image capture device may have a first scan rate associated with acquisition of the first series of image scan lines that may be different from a second scan rate associated with acquisition of the second series of image scan lines, such that the first image capture device acquires the first overlap portion of the first image over a period of time during which the second overlap portion of the second image is acquired, wherein the period of time is associated with a ratio between the first scan rate and the second scan rate.

Consistent with disclosed embodiments, an imaging system for a vehicle is provided, the system comprising a first image capture device having a first field of view and configured to acquire a first image relative to a scene associated with the vehicle, the first image being acquired as a first series of image scan lines captured using a rolling shutter. The system may also include a second image capture device having a second field of view different from the first field of view and that at least partially overlaps the first field of view, the second image capture device being configured to acquire a second image relative to the scene associated with the vehicle, the second image being acquired as a second series of Image scan lines captured using a rolling shutter. As a result of overlap between the first field of view and the second field of view, a first overlap portion of the first image may correspond to a second overlap portion of the second image. They system may include at least one processing device configured to: receive the first image from the first image capture device; receive the second image from the second image capture device; and correlate at least a first area of the first overlap portion of the first image with a corresponding second area of the second overlap portion of the second image.

It is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 1b is a diagrammatic, top view illustration of the embodiment shown in FIG. 1a;

DETAILED DESCRIPTION

Figure 1A:
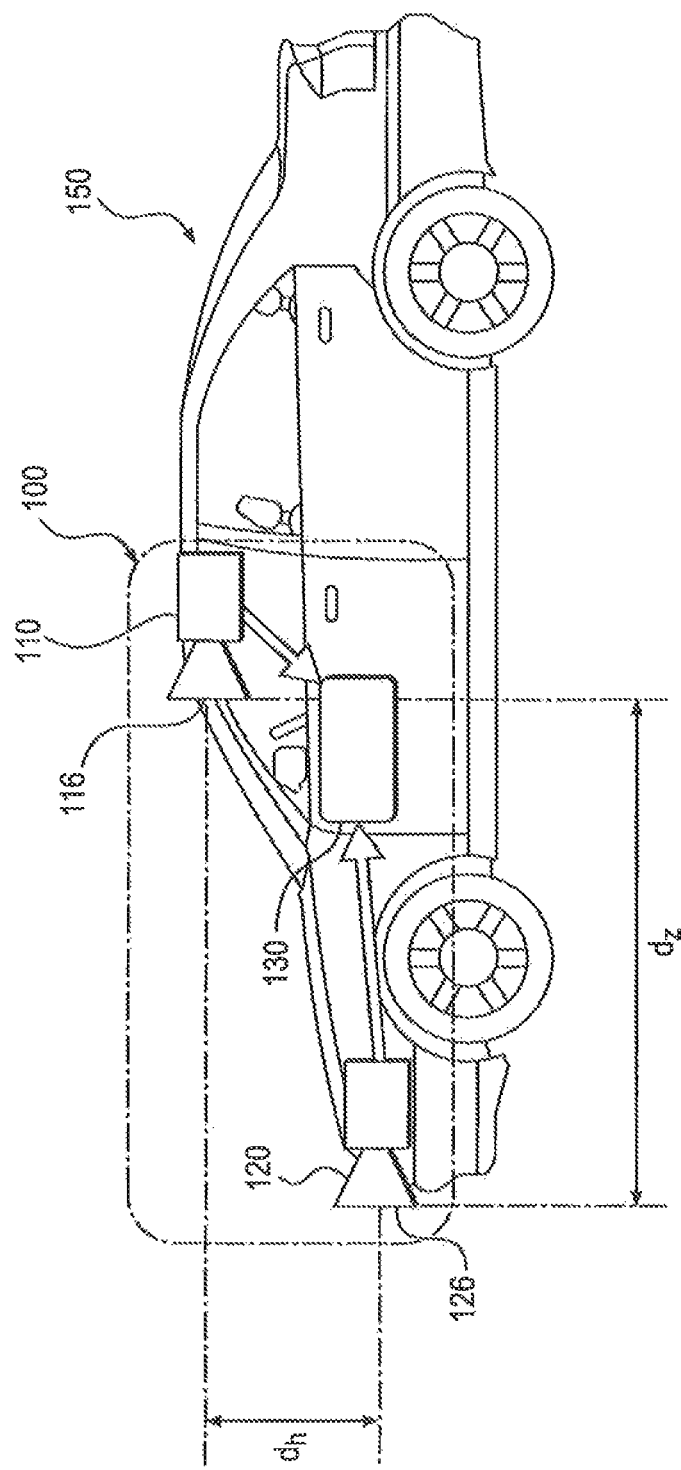
FIG. 1a is a diagrammatic, side view representation of an exemplary vehicle imaging system consistent with the presently disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limiting of the disclosed embodiments. Instead, the proper scope is defined by the appended claims.

Figure 1B:
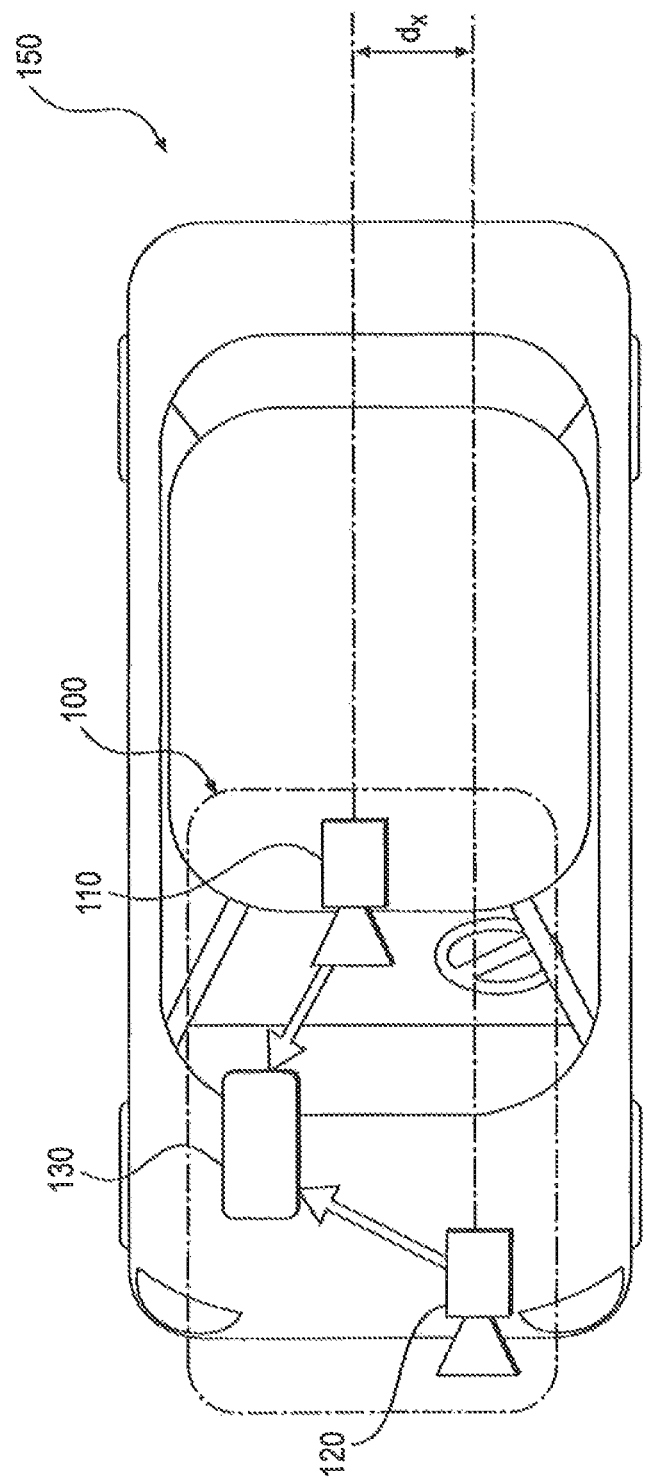

Referring to the accompanying drawings, FIG. 1a is a diagrammatic, side view representation of an exemplary vehicle imaging system consistent with the presently disclosed. FIG. 1b is diagrammatic, top view illustration of the embodiment shown in FIG. 1a. As illustrated in FIG. 1a, a disclosed embodiment of the present invention may include a vehicle 150 having a system 100 with a first image capture device 110 and a second image capture device 120 and a processor 130. While two image capture devices 110 and 120 are shown, it should be understood that other embodiments may include more than two image capture devices.

It is to be understood that the disclosed embodiments are not limited to vehicles and could be applied in other contexts. It is also to be understood that disclosed embodiments are not limited to a particular type of vehicle 150 and may be applicable to all types of vehicles including automobiles, truck trailers and other types of vehicles.

The processor 130 may comprise various types of devices. For example, processor 130 may include a controller unit, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that when executed by the processor, controls the operation of the system. The memory may include databases and Image processing software. The memory may comprise any number of random access memory, read only memory, flash memory, disk drives, optical storage, tape storage, removable storage and other types of storage. In one instance, the memory may be separate from the processor 130. In another instance, the memory may be integrated into the processor 130.

The first image capture device 110 may include any suitable type of image capture device. Image capture device 110 may include an optical axis 116. In one instance, the image capture device 110 may include an Aptina M9V024 WVGA sensor with a global shutter. In other embodiments, image capture device 110 may include a rolling shutter. Image capture device 110 may include various optical elements. In some embodiments one or more lenses may be included, for example, to provide a desired focal length and field of view for the image capture device. In some embodiments, image capture device 110 may be associated with a 6 mm lens or a 12 mm lens. In some embodiments, image capture device may be configured to capture images having a desired FOV, including, for example, a wide FOV, such as a 46 degree FOV, 50 degree FOV, 52 degree FOV, or greater. In some embodiments, image capture device 110 may include a wide angle bumper camera or one with up to a 180 degree FOV.

The first image capture device 110 may acquire a plurality of first images relative to a scene associated with the vehicle 150. Each of the plurality of first images may be acquired as a series of image scan lines, which may be captured using a rolling shutter. Each scan line may include a plurality of pixels.

The first image capture device 110 may have a scan rate associated with acquisition of each of the first series of image scan lines. The scan rate may refer to a rate at which an image sensor can acquire image data associated with each pixel included in a particular scan line.

The first image capture device 110 may contain any suitable type of Image sensor, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

The use of a rolling shutter may result in pixels in different rows being exposed and captured at different times, which may cause skew and other image artifacts in the captured image frame. On the other hand, when the image capture device 110 is configured to operate with a global or synchronous shutter, all of the pixels may be exposed for the same amount of time and during a common exposure period. As a result, the image data in a frame collected from a system employing a global shutter represents a snapshot of the entire FOV at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 120 may be any type of image capture device. Like the first image capture device 110, image capture device 120 may include an optical axis 126. In one embodiment, image capture device 120 may include an Aptina M9V024 WVGA sensor with a global shutter. Alternatively, image capture device 120 may include a rolling shutter. Like image capture device 110, image capture device 120 may be configured to include various lenses and optical elements. In some embodiments, lenses associated with image capture device 120 may provide a FOV that is the same as or narrower than a FOV associated with image capture device 110. For example, image capture device 120 may have an FOV of 40 degrees, 30 degrees, 26 degrees, 23 degrees, 20 degrees, or less.

Image capture device 120 may acquire a plurality of second images relative to a scene associated with the vehicle 150. Each of the plurality of second images may be acquired as a second series of image scan lines, which may be captured using a rolling shutter. Each scan line or row may have a plurality of pixels. The second image capture device 120 may have a second scan rate associated with acquisition of each of Image scan lines included in the second series.

The second image capture device 120 may contain any type of image sensors, including CCD sensors or CMOS sensors, for example. In one embodiment, the CMOS image sensor may be associated with a rolling shutter, where the image rows may be exposed and captured sequentially one after another to provide each image frame.

Each image capture device 110, 120 may be positioned at any suitable position and orientation relative to vehicle 150. The relative positioning of the two image capture devices 110 and 120 may be selected to aid in fusing together the information acquired from the image capture devices. For example, in some embodiments, a FOV associated with image capture device 120 may overlap partially or fully with a FOV associated with image capture device 110.

Figure 1C:
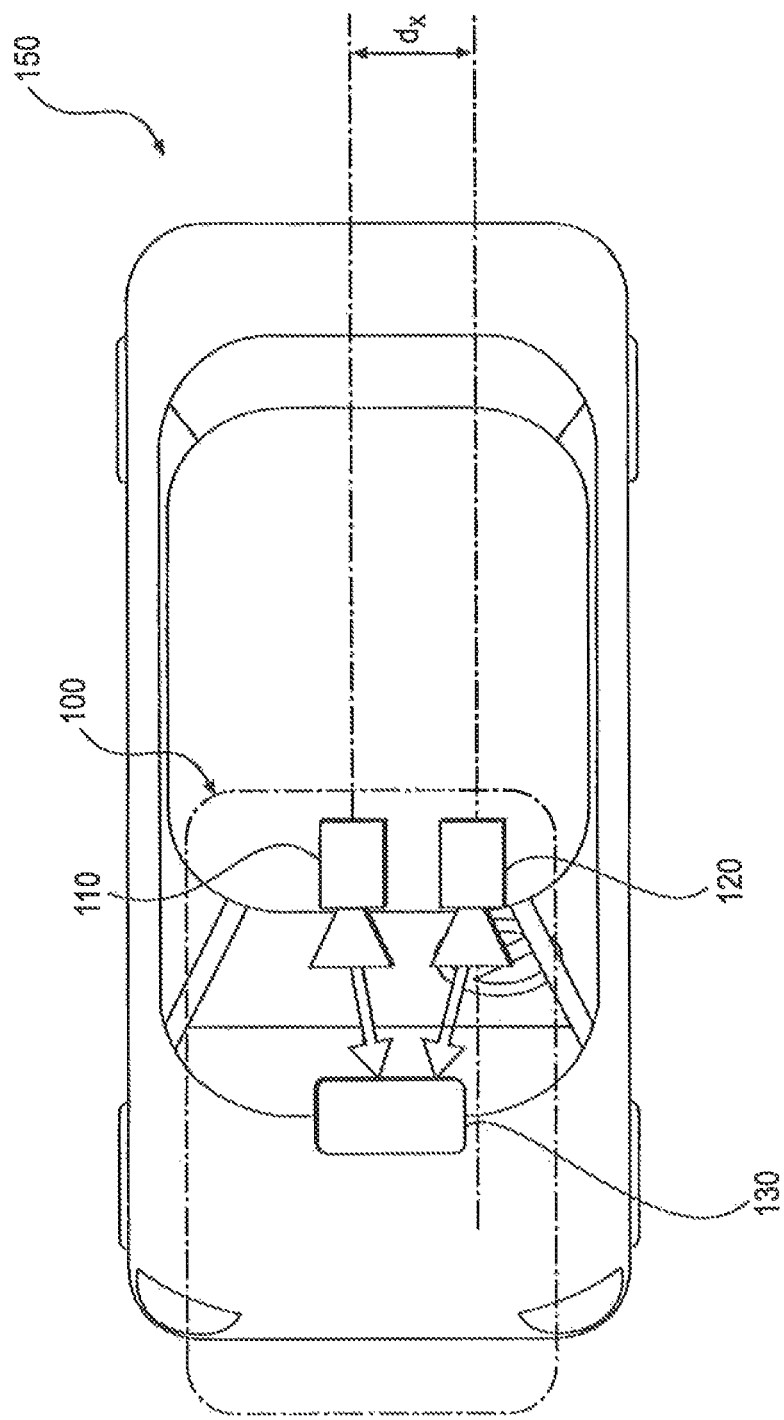
FIG. 1c is a diagrammatic, top view illustration of an exemplary vehicle imaging system with another camera configuration consistent with the presently disclosed embodiments.

Image capture devices 110 and 120 may be located on vehicle 150 at any suitable relative heights. In one instance, there may be a height difference between the two image capture devices 110 and 120, which may provide sufficient parallax information to enable stereo analysis. The difference in the height at which the two image capture devices 110 and 120 are mounted is denoted by $d_h$, as shown in FIG. 1a. There may also be a lateral displacement difference between the image capture devices 110 and 120, giving additional parallax information for stereo analysis by processing unit 130, for example. The difference in the lateral displacement may be denoted by $d_x$, as shown in FIG. 1b. In some embodiments, there may exist fore or aft displacement (e.g., range displacement) between image capture device 110 and image capture device 120. For example, image capture device 110 may be located 0.5, to 2 meters or more behind image capture device 120. This type of displacement may enable one of the image capture devices to cover potential blind spots of the other image capture device(s). The difference in the range displacement is denoted by $d_z$, as shown in FIG. 1(a). In other embodiments as illustrated in FIG. 1c, there may be lateral displacement dx, but range displacement dz=0 and height displacement dh=0.

Image capture device 110 may have any suitable resolution capability (e.g., number of pixels associated with the image sensor), and the resolution of the image sensor(s) associated with image capture device 110 may be higher, lower, or the same as the resolution of the image sensor(s) associated with image capture device 120. In some embodiments, the image sensor(s) associated with image capture device 110 and/or image capture device 120 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 110 may be higher, lower, or the same as the frame rate associated with image capture device 120. The frame rate associated with the image capture devices 110 and 120 may depend on a variety of factors that may affect the timing of the frame rate. For example, one or both of image capture devices 110 and/or 120 may include a selectable pixel delay period imposed before or after acquisition of image data associated with one or more pixels of an image sensor in image capture device 110 and/or 120. Generally, image data corresponding to each pixel may be acquired according to a clock rate for the device (e.g., one pixel per clock cycle). Additionally, in embodiments including a rolling shutter, one or both of image capture devices 110 and/or 120 may include a selectable horizontal blanking period imposed before or after acquisition of image data associated with a row of pixels of an image sensor in Image capture device 110 and/or 120. Further, one or both of image capture devices 110 and/or 120 may include a selectable vertical blanking period imposed before or after acquisition of image data associated with an image frame of image capture device 110 and/or 120.

These timing controls may enable synchronization of frame rates associated with image capture device 110 and 120, even where the line scan rates of each are different. And, as will be discussed in greater detail below, these selectable timing controls, among other factors (e.g., mage sensor resolution, maximum line scan rates, etc.) may enable synchronization of image capture from an area where the field of view of image capture device 110 overlaps with a field of view of Image capture device 120, even where the field of view of image capture device 110 is different from the field of view of image capture device 120.

Additionally, frame rate timing in image capture device 110 and/or 120 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture device 110 and/or 120 is the maximum line scan rate. For example, acquisition of a row of image data from an Image sensor included in Image capture device 110 and/or 120 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, image capture device 120 may have a maximum line scan rate that is higher than a maximum line scan rate associated with image capture device 110. In some embodiments, the maximum line scan rate of image capture device 120 may be 1.25, 1.5, 1.75, or 2 times or more greater than a maximum line scan rate of image capture device 110.

In a another embodiment, image capture devices 110 and 120 may have the same maximum line scan rate, but image capture device 110 may be operated at a scan rate less than or equal to its maximum scan rate. The system may be configured such that image capture device 120 operates at a line scan rate that is equal to the line scan rate of image capture device 110. In other instances, the system may be configured such that the line scan rate of image capture device 120 may be 1.25, 1.5, 1.75, or 2 times or more greater than the line scan rate of image capture device 110.

In some embodiments, image capture devices 110 and 120 may be asymmetric. That is, they may include cameras having different fields of view (FOV) and focal lengths. The fields of view of image capture devices 110 and 120 may include any desired area relative to an environment of vehicle 150, for example. In some embodiments, either or both of image capture devices 110 and 120 may be configured to acquire image data from an environment in front of vehicle 150, behind vehicle 150, to the sides of vehicle 150, or combinations thereof.

Further, the focal length associated with each image capture device 110 and/or 120 may be selectable (e.g., by inclusion of appropriate lenses etc.) such that each device acquires images of objects at a desired distance range relative to vehicle 150. For example, in some embodiments image capture devices 110 and 120 may acquire images of close-up objects within a few meters from the vehicle. Image capture devices 110 and 120 may also be configured to acquire images of objects at ranges more distant from the vehicle (e.g., 25 m, 50 m, 100 m, 150 m, or more). Further, the focal lengths of image capture devices 110 and 120 may be selected such that one image capture device (e.g., image capture device 110) can acquire images of objects relatively close to the vehicle (e.g., within 10 m or within 20 m) while the other image capture device (e.g., image capture device 120) can acquire images of more distant objects (e.g., greater than 20 m, 50 m, 100 m, 150 m, etc.) from vehicle 150.

The field of view associated with each of image capture devices 110 and 120 may depend on the respective focal length. For example, as the focal length increases, the corresponding field of view decreases.

Image capture device 110 and image capture device 120 may be configured to have any suitable field of view. In one particular example, image capture device 110 may have a horizontal FOV of 46 degrees and image capture device 120 may have a horizontal FOV of 23 degrees. In another instance, image capture device 110 may have a horizontal FOV of 52 degrees and image capture device 120 may have a horizontal FOV of 26 degrees. In some embodiments, a ratio of the FOV of image capture device 110 to the FOV of image capture device 120 may vary between 1.5 to 2.0. In other embodiments, this ratio may vary between 1.25 and 2.25.

System 100 may be configured so that a field of view of image capture device 110 overlaps with a field of view of image capture device 120 (at least partially or fully). In some embodiments, system 100 may be configured such that the field of view of image capture device 120, for example, falls within (e.g., is narrower than) and shares a common center with the field of view of image capture device 110. In other embodiments, the image capture devices 110 and 120 may capture adjacent FOVs or may have partial overlap in their FOVs. In some embodiments, the fields of view of devices 110 and 120 may be aligned such that a center of the narrower FOV device 120 may be located in a lower half of the field of view of the wider FOV device 110 (e.g., in the area below line 280 in FIG. 2a).

Figure 2A:
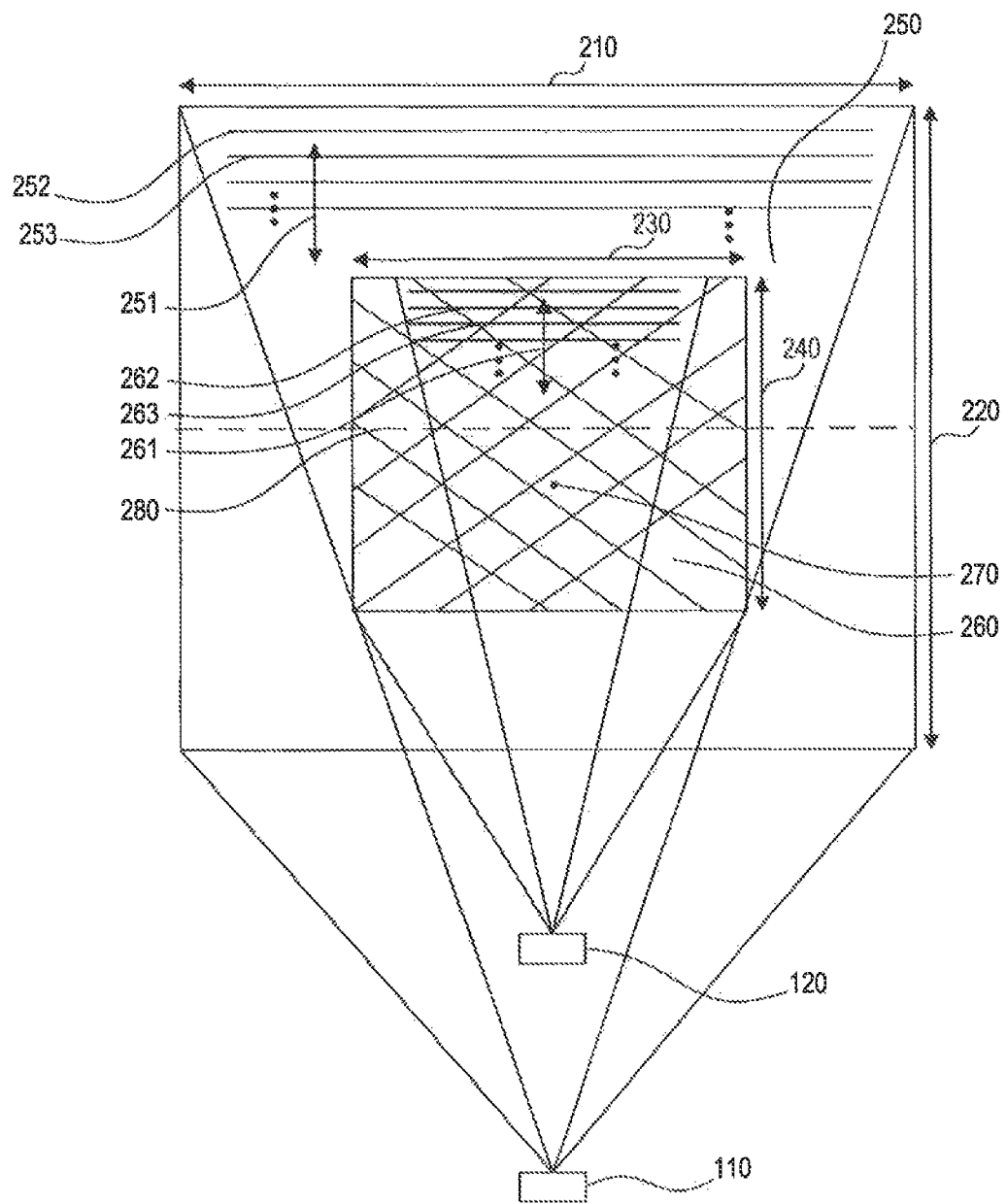
FIG. 2a represents overlapping fields of view of two cameras having different fields of view, according to an exemplary disclosed embodiment.
Figure 2B:
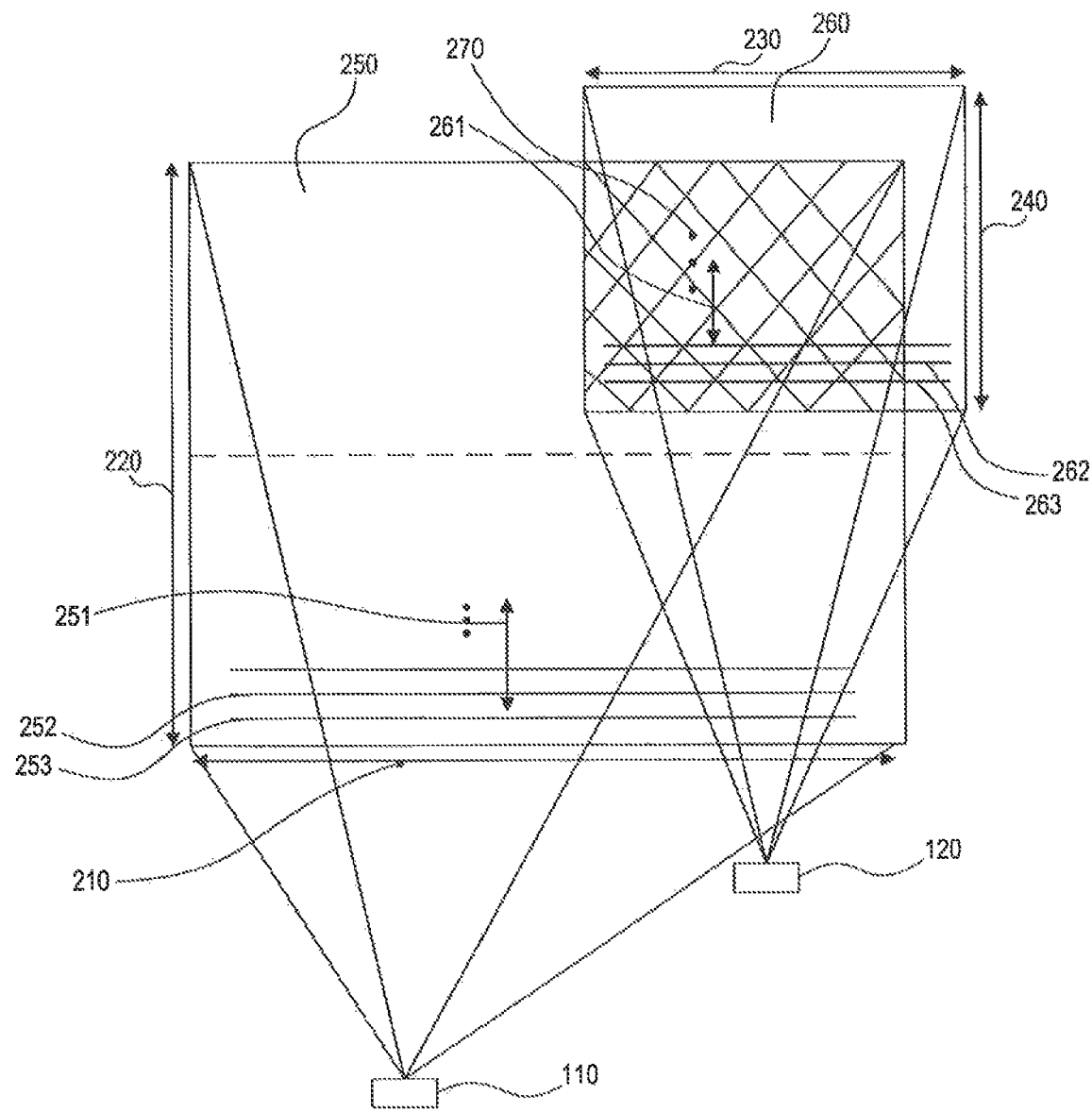
FIG. 2b represents overlapping fields of view of two cameras having different fields of view, according to another exemplary disclosed embodiment.

FIG. 2a is shows overlapping fields of view of two cameras having different fields of view, according to an exemplary disclosed embodiment. FIG. 2b represents overlapping fields of view of two cameras having different fields of view, according to another exemplary disclosed embodiment.

The wide FOV camera 110 has a first FOV 250, which may be defined by a horizontal FOV 210 and a vertical FOV 220. In one instance, the wide FOV camera 110 may have a horizontal FOV 210 of 46 degrees and an image resolution of 1280×960 pixels. The wide FOV camera 110 may have a rolling shutter with a rolling scan direction 251. The rolling shutter direction 251 could be in any direction vertically or horizontally. In the embodiment of FIG. 2a, use of the rolling shutter would enable capture of an Image as a plurality of scan lines, e.g., scan lines 252 and 253.

The narrow FOV camera 120 has a second FOV 260, which may be defined by a horizontal FOV 230 and a vertical FOV 240. The narrow FOV camera 120 may also have a rolling shutter with a rolling scan direction 261. In one instance, the narrow FOV camera 120 may have a horizontal FOV 230 of 23 degrees and an image resolution the same as or different from wide FOV camera 110. For example, in some embodiments, narrow FOV camera 120 may have an Image resolution of 1280×960. In other embodiments, the narrow FOV camera 120 may have an Image resolution different from wide FOV camera 110 (e.g., 640×480 pixels). The rolling shutter direction 261 could be in any direction vertically or horizontally, and the rolling shutter would enable image capture as a plurality of scan lines, including lines 262 and 263, for example.

The narrow FOV 260 and the wide FOV 250 could be setup to overlap partially or fully in FOV. Overlap region 270, shown in cross hatching in FIGS. 2a and 2b, represents a region where the narrow field of view 260 overlaps with the wide field of view 250. As shown in FIG. 2a, region 270 may correspond to the entire field of view of the narrow image capture device 120. Further, the fields of view of image capture device 110 and 120 may be aligned such that region 270 is centered within the wider field of view of image capture device 110. Alternatively, as shown in FIG. 2b, region 270 need not represent the entire field of view of the narrower field of view image capture device 120, nor must it be centered within the field of view of the wider field of view image capture device. Rather, as shown in FIG. 2b, region 270 may be offset from the center of image capture device 110. Further, the fields of view of Image capture device 110 and 120 may be aligned such that region 270 corresponds to an overlap region that is less than the entire fields of view of image capture device 110 and image capture device 120.

In embodiments that use a rolling shutter, an image frame from image capture device 110 may be acquired as a series of sequentially acquired scan lines, such as lines 252 and 253 in FIG. 2a. Similarly, a rolling shutter associated with image capture device 120 will enable capturing of image frames as a series of sequentially acquired scan lines 263 and 263, as shown in FIG. 2a. When image capture device 110 has a focal length and field of view different from the focal length and field of view of image capture device 120, and rolling shutters are employed on both devices, image capture device 110 and 120 may capture portions of their respective fields of view corresponding to overlap region 270 at different times. Such a lack of synchronization can lead to difficulties in correlated stereo analysis of the acquired images.

To illustrate further, one exemplary system may include image capture devices 110 and 120 each having a sensor resolution of 1280×960. Thus, if rolling shutters are employed to acquire image frames from both image devices, then the image frames from both image capture devices will be acquired as a series of 960 scan lines each including 1280 pixels of Image data. In this example, image capture device 110 may have a 52 degree field of view, and image capture device may have a 26 degree field of view, and both fields of view may share a common center, as shown in FIG. 2a. If both image capture devices included a similar line scan rates, then it becomes apparent that the some or all of the portions of the image frames, from each image capture device, that correspond to overlap region 270 will be acquired at different times.

For example, assuming that both image capture devices begin to acquire their respective image frames at the same time (i.e., the first scan line of both image capture devices is synched), then while image capture device 120 is acquiring the first line from overlapping region 270, image capture device is acquiring an image line from the top of its field of view, for example, which falls outside of overlap region 270. In the example where image capture device 120 has a field of view that is one-half the angular width of the field of view of image capture device 110, image capture device 110 will not acquire an image line corresponding to overlap region 270 until it reaches scan line 240 (one quarter of the way through its image frame). Again, assuming both image capture devices have the same line scan rate, then when image capture device 110 reaches its scan line number 240, then image capture device 120 will also be acquiring its scan line 240, which is 25% of the way through overlap region 270. Further, when image capture device 120 finishes the last line of its scan (i.e., scan line 960) it will be at the bottom of overlap region 270. At the same time, however, image capture device 110 will be acquiring the last line of its field of view, which falls outside of overlap region 270. Indeed, only scan lines 240 through 720 in image capture device 110 will include overlap region 270, while all 960 scan lines from image capture device 120 will correspond to overlap region 270. Further, in this example, only the center scan line (corresponding to dashed line 280 in FIG. 2a) will be acquired by both image capture devices at the same time. All other lines corresponding to overlap region 270 will be acquired at different times, which again, can lead to difficulties in performing stereo analysis associated with the overlapping region 270.

By adjusting the image acquisition timing control parameters of each image capture device, however, it may be possible to ensure that the portions of the image frames of each image capture device corresponding to overlap region 270 are acquired during the same period of time.

In general, this synchronization may be accomplished in a variety of ways. For example, in one embodiment, image capture device 120 (having the narrower field of view) may be configured to have a line scan rate that is different from a line scan rate associated with image capture device 110. For example, the line scan rate of image capture device 120 may be higher than a line scan rate for image capture device 110. In some embodiments, the line scan rate for image capture device 120 may be two times (or more) higher than a line scan rate for image capture device 110. Generally, the narrower field of view image capture device 120 should have a scan rate at least high enough such that the portions of the Image frames from both image capture devices 110 and 120 that correspond to overlap region 270 may be acquired during the same time period.

Returning to the example in which image capture device 110 has a 52 degree field of view and image capture device 110 has a 26 degree field of view, and both include image sensor resolutions of 1280×960, overlap region 270 will correspond to scan lines 240 through 720 (480 scan lines total) in the image frame of image capture device 110. On the other hand, overlap region 270 will correspond to the full 960 scan lines in image capture device 120. As a result, in order for lines 240 through 720 in image capture device 110 to be captured during the same time period as the 960 scan lines of image capture device 120, the line scan rate of image capture device 120 could be at least two times higher than a line scan rate of Image capture device 110. Such an arrangement may enable image capture device 120 to capture all 960 lines in the same amount of time that it takes image capture device 110 to acquire the 480 scan lines from lines 240 to 720 that correspond to overlap region 270.

Line scan rate, however, is not the only timing control parameter that can enable synching of the acquisition of those portions of the respective image frames corresponding to overlap region 270. The horizontal blanking period, vertical blanking period, and pixel delay for one or both of image capture devices 110 and 120 may be selected to achieve the desired capture synch in the overlap region 270. For example, in embodiments where the line scan rate of image capture device 120 may be too low to ensure that acquisition of the images from overlap region 270 are synched, the horizontal blanking period of image capture device 110 (the wider field of view device) may be increased to slow the effective line scan rate of Image capture device 110. Additionally or alternatively, a pixel delay associated with image capture device 110 may be increased to slow the effective line scan rate of Image capture device 110.

Even where image capture device 120 has a sufficient line scan rate to enable synching of image acquisition in overlap region 270, the total frame rate of each image capture device may be the same so that the synching of image acquisition in overlap region 270 is repeatable. Returning to the example, to synch image acquisition in overlap region 270, image capture device 120 should begin acquiring data at scan line number 1 when image capture device 110 reaches scan line 240. While image capture device 110 acquires lines 240 to 720, image capture device 120 acquires all 960 of its scan lines. While image capture device 110 is capturing lines 721 to 960 and 1 to 239, image capture device 120 should remain idle to ensure that in each frame overlap region 270 is synched. To provide this delay in image capture device 120 to allow image capture device 110 to acquire the image data outside of overlap region 270, image capture device 120 may be configured with a longer vertical blanking period than image capture device 110.

It should be noted that in some embodiments as described above, the synchronized portions of images from image capture devices 110 and 120 correspond to overlap region 270. In other cases, the overlap portions of image capture devices 110 and 120 may have one line synchronized within overlap region 270, and moving away from that line, the lines may become less and less synchronized. This may be presented by dTL. The system may reduce the rate at which the lines become unsynchronized by, for instance, adjusting the scan line rate of Image capture device 120. For instance, where the focal length ratio between image capture devices 110 and 120 is 2, the system could adjust TLn=0.5*TLw, which may result in dTL=0. In another instance, TLn=0.6*TLw. In some embodiments, "synchronization" of Image acquisition within overlap area 270 may be achieved even if the timing of image acquisition in that region by both image capture devices is not identical. For example, adequate synchronization (e.g., to enable stereo analysis) may be achieved if a difference in timing between acquisition of the image portion from device 120 in overlap region 270 is within 1%, 5%, 10%, or 15% of the time required for device 110 to acquire the image portion corresponding to overlap region 270.

For example, as described above, where a particular ratio between focal lengths exists between image capture devices 120 and 110 (e.g., 2:1), then a ratio of the line scan rate of the narrower FOV device 120 to the line scan rate of the wider FOV device 110 should be at least as high as the focal length ratio in order to synchronize the acquired images over the entire overlap region 270. In some embodiments, however, lower scan rate ratios may still be useful. For example, even with a line scan rate ratio lower than the focal length ratio between image capture devices 120 and 110, image portions from the device 110 and 120 images could still be synchronized over a portion (and often, a substantial portion) of overlap area 270.

Assuming a focal length ratio between devices 120 and 110 of 2:1, for example, then a line scan ratio of at least 2:1 will enable synchronization of Images over the entire FOV overlap region 270. Synchronization of images over less than the entire region 270, however, may still be useful. For example, in some embodiments a line scan ratio of 1.9, 1.8. 1.7, 1.6, 1.5, or less, may still provide a useful level of synchronization between images from devices 110 and 120 in at least a portion of the area of overlap region 270.

The period of time during which acquisition of an image portion from device 110 may be synchronized with acquisition of an image portion from device 120 within overlap region 270 may be related to the ratio between the line scan rate of device 110 and the line scan rate of device 120. For instance, where the ratio of FOVs is 2 but the maximum ratio of scan line timing is 1.8, the period of time may be based on the scan line timing ratio of 1.8 (as well as on any applied pixel delays, horizontal blanking periods, etc.).

In addition to adjustment of the timing control parameters (e.g., line scan rate, vertical blanking period, horizontal blanking period, pixel delay, etc.), other techniques may also be employed either together with or separate from adjustment of the timing control parameters. In some embodiments, image capture device 120 (the narrower field of view device) may be configured with a lower resolution image sensor than image capture device 110. Thus, if image capture device 110 has an image sensor with a resolution of 1280×960, then configuring image capture device 120 with an image sensor having a lower resolution (e.g., 640×480) may alleviate the need for a higher line scan rate in image capture device 120. Assuming the same 52 degree/26 degree example described above, a 1280×960 pixel sensor in image capture device 110 could be synched with a 640×480 pixel sensor in image capture device 120 within overlap region 270 even if both devices employed similar line scan rates. In this example, while image capture device 110 was acquiring the 480 lines corresponding to overlap region 270 (i.e., lines 240 to 720 in image capture device 110), image capture device 120 would be acquiring its own 480 scan lines corresponding to overlap region 270.

Additionally, or alternatively, the demand for a higher scan rate in the narrower field of view device may be alleviated if the narrower field of view image capture device did not sample all image lines in each frame. For example, during acquisition of one frame, image capture device 120 may be configured such that it samples only a subset of the available scan lines (e.g., the odd numbered scan lines). During capture of the next frame, image capture devices 120 may be configured such that it samples the even numbered scan lines. Through this type of interlacing technique, the amount of time required to acquire the image data associated with overlap region 270 may be halved in comparison to a technique in which all scan lines are acquired for every frame.

In another example relative to selection of the timing control parameters, if a line scan rate of image capture device 120 may be increased, then the target ratio between focal lengths may also be reduced so that these match the ratio between line timing. For example if image capture device 110 has a horizontal FOV 210 of 46° and is running at a line timing of 45 KHz (22.2 usec) but the sensor can support line timing of 60 KHz (15.2 usec) then a 32° horizontal FOV 230 of image capture device 120 can be supported and synchronized:

$$\frac{15.2_{usec} \times 46°}{22.2_{usec}} = 31.7°. \quad (3)$$

Here, the TLn may be 15.2 usec, TLw may be 22.2 usec, and the wide horizontal FOV 210 may be 46°.

An image capture device 120 with a 30° horizontal FOV 230 might represent a suitable solution for providing increased resolution (by 50%) and small value of δTL:

$$\delta T_L = \alpha T_{Ln} - T_{Lw} \quad (4)$$

Here $$\alpha = \frac{46}{30}$$

is the ratio between the two horizontal FOVs 210 and 230. For instance, the ratio between the wide horizontal FOV and the narrow horizontal FOV may be 52/26; 25/28; 60/30; 60/32; 46/36; 46/23; or any other suitable ratio. Such ratios may give the narrow FOV camera more range, and may allow detection of smaller objects at a greater distance.

$$\delta T_L = \alpha T_{Ln} - T_{Lw} = \frac{46°}{30} \times 15.2_{usec} - 22.2_{usec} = 1.1_{usec} \quad (5)$$

Any suitable ratio of focal lengths/fields of view may be selected relative to image capture device 110 and Image capture device 120. In some embodiments, this ratio may be set at 1.5, 1.6, 1.7, 1.8, up to 2, or greater than 2.

As noted above, both image capture device 110 and image capture device 120 may be configured to output frames at the same rate. For example, the total number of clocks per frame (including acquired scan lines and blanking periods, delays, etc.) may be equal in both devices. And, to achieve the desired synch in overlap region 270, the line scan rate timing multiplied by the number of rows covering overlap region 270 may be the same for the two image capture devices.

Once the cameras have been synched, they may remain in lock-step operation such that the desired synch in overlap region 270 and the similar frame rates are preserved. The system may include one or more processing devices (e.g., processing device 130) that may periodically perform a timing check to determine whether the first image capture device 110 and the second image capture device 120 remain synchronized in capturing image data within overlap region 270 and/or in overall frame rate. Processing device 130 may adjust one or more timing parameters or may reset one or more aspects of the image scan (e.g., a hard jump to a desired scan line number, such as the first scan line, or to any other scan line within the image frame) if a lack of synchronization is observed. Such a resynchronization process may occur periodically throughout operation of image capture devices 110 and 120.

Image capture devices 110 and 120 may be used for independent applications in some embodiments. In other embodiments, synching of the image capture in overlap region 270, for example, may enable applications that combine the information from both devices to provide stereo analysis (e.g., stereo depth determination, among others).

In addition to using rolling shutters in image capture devices 110 and 120, as described above, some embodiments may employ a global shutter. In such embodiments, rather than capturing image frames as a series of sequentially acquired image scan lines, all pixel rows in a particular image from are sampled and acquired at the same time.

Figure 3:
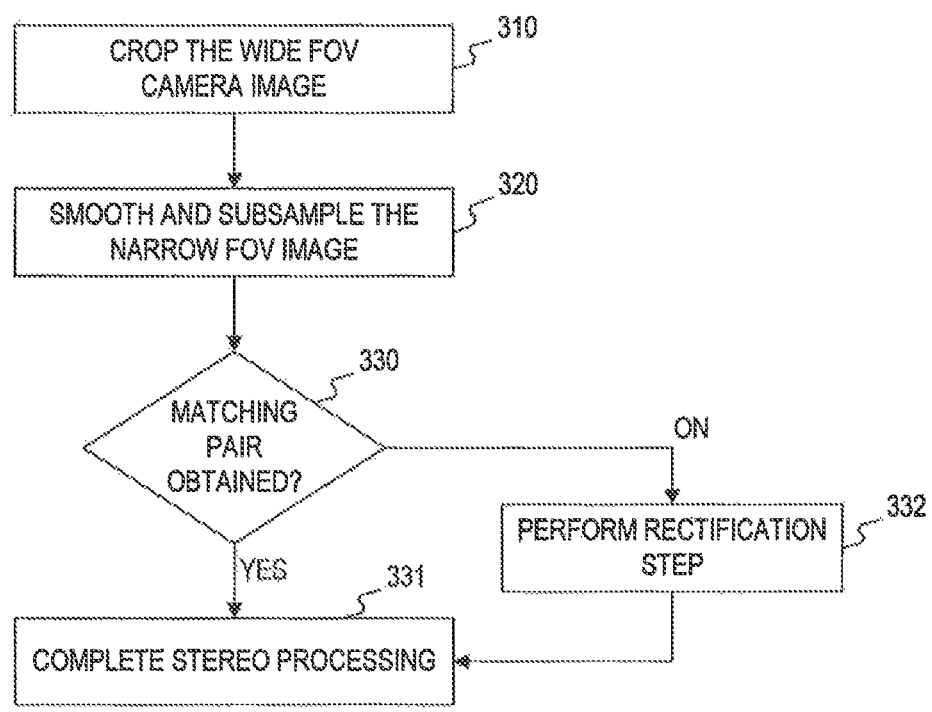
FIG. 3 represents an exemplary process for use in systems employing cameras with global shutters.

FIG. 3 represents an exemplary process for use in systems employing image capture devices with global shutters. As shown in FIG. 3, for a system where the image capture devices 110 and 120 have global shutters, stereo processing in the overlap region 270 may involve simply cropping the wide FOV camera image data outside of overlap region 270 (step 310). Next, the image data of the narrow FOV image capture device may be smoothed and subsampled (step 320) in order to get a matching image pair. Stereo processing may then be completed based on the matching image pair (step 331). If a matching image pair is not obtained, a rectification step might be required in practice (step 332).

In the rolling shutter embodiments described above, timing control parameters etc. may be controlled in order to synchronize capture of image data within overlap region 270 and also to synchronize overall frame rates between image capture devices 110 and 120. In addition to this front-end, hardware-based synchronization solution, other embodiments may rely upon back-end processing as a basis for the stereo analysis of image data from overlapping region 270. That is, rather than forcing image capture device 110 and 120 to acquire image data in the overlapping region 270 over the same time period, this image data can be captured at different time periods, and processing may be performed on the captured image data in order to enable meaningful stereo analysis based on this data.

The back-end processing solutions may rely on the fact that a single scan line of Image capture device 110 may be synchronized with a single scan line of image capture device 120. The particular lines in each image capture device that are synchronized may be selectable such that in different image frames, the selected synchronized line may change.

In a particular image frame, the image data collected from both image capture devices 110 and 120 will correspond to one another at the selected synchronized scan line. In image capture devices that have different fields of view, such as those shown in FIGS. 2a and 2b, scan lines away from the synchronized line will be out of synch. Further the loss of synchronization in image scan lines increases away from the selected synchronized line.

Where scan lines lack synchronization, disparities in the image data may exist as a result of corresponding scan lines (e.g., in overlap region 270) being captured during different time periods. For example, if an object is moving through a scene relative to image capture devices 110 and 120, then at the synchronized line, the captured image data from both of image capture devices 110 and 120 will indicate the same position for the object (because the synchronized scan line in each image capture device is captured during the same time period). Image scan lines acquired away from the synchronized line, however, may lack synchronization and, therefore, may result in position disparities for the moving object.

Returning to the example of an image capture device 110 with a FOV of 52 degrees and an image capture device 120 having a FOV of 26, where both devices include image sensors with a resolution of 1280×960, the selected synchronized line may occur at any selected line location. In some embodiments, the synchronized line may occur within overlap region 270. For example, the synchronized scan line may be selected at a center of overlap region 270. Thus, while the image data acquired at the synchronized line at the center of overlap region 270 will match in time, the Image data captured at lines away from the synchronized line will not match in time. And, the level of timing mismatch increases away from the synchronized line. In the example where the central scan line in both image capture devices is synchronized, then the first scan line of overlap region 270 will be captured at different times by image capture devices 110 and 120. For example, in image capture device 120 (the narrower FOV device), the first scan line acquired in overlap region 270 will correspond to the first scan line acquired in the frame. On the other hand, the first scan line acquired in overlap region 270 by image capture device 110 will occur at scan line number 240. But, at the same time image capture device 110 is acquiring scan line 240, image capture device 120 may also be acquiring its own scan line 240. In image capture device 120, however, scan line 240 is already 25% through overlap region 270. Thus, it can be seen that in image capture device 110, the first scan line acquired in overlap region 270 will be acquired later than the first image scan line in overlap region 270 is captured by image capture device 120.

This time difference, which decreases approaching the selected synchronized line, can result in image disparities. For example, in a simple example, a moving object may appear in different locations to image capture device 110 than it does to image capture device 120 in scan lines away from the synchronized line. The extent of the apparent position difference may increase as the timing difference increases away from the synchronized line.

The extent of the introduced disparities, however, is predictable because the line scan timing is known in both image capture device 110 and image capture device 120. Thus, processing device 130 may analyze the acquired image data from both devices and may be able to obtain stereo analysis information from overlap region 270 by taking into account the expected disparities introduced by the line scanning timing differences.

Because the line scan timing converges at the selected synchronized line, there may exist a strip of scan lines about the synchronized line in which the introduced disparities are small or even negligible. Thus, in a strip of scan lines around the synchronized scan line, less processing may be required to account for observed disparities. In some embodiments, this low disparity strip may be centered about an object of interest by judiciously selecting the synchronized scan line to overlap with the object of interest.

Different types of objects encountered on a roadway (e.g., upright objects, moving objects, low objects near to the road surface, etc.) may behave differently in terms of the acquired image disparities. Thus, selection of the synchronized scan line may depend on the type of an object of interest in a scene (e.g., within overlap region 270).

As noted above, the synchronized line location may be adjusted. Synchronizing a particular line may be performed on any image capture device 110, 120 which provides basic synchronization technology, potentially allowing any particular row to be chosen. However, if only one line can be synchronized, there may not be one optimal line for all situations. That is, it might be useful to switch the line that is synchronized between two or more image frames. Such an adjustment of the selected synchronized scan line may be accomplished by any suitable technique.

For example, in some embodiments, the vertical blanking period of the narrow FOV image capture device 120 may be adjusted between frames. In some embodiments, the vertical blanking period may be selected such that image acquisition by image capture device 120 falls behind and then catches up with image capture device 110 such that different lines are synchronized in different image frames. In another embodiment, the vertical blanking of the narrow FOV image capture device 120 could be set at a desired difference relative to image capture device 110. For example, if the vertical blanking period of image capture device 120 is 100 lines fewer than the wide FOV image capture device 110, then in every subsequent frame, the synchronized line location will vary by a certain amount (e.g., y=−100).

In one instance, the system may be configured so that selection of the synchronized line depends on a speed of the vehicle. In another instance, the system may be configured such that the selected first scan line and the selected second scan line both correspond to a predetermined distance away from the vehicle (e.g., where an object of interest may be located).

As noted above, where only a single scan line is both synchronized and spatially aligned between image capture devices 110 and 120, the lines above and below this synchronized line may gradually become less and less in synch as the distance from the synchronized line increases:

$$\delta t(y) = (y - y_0) \delta T_L \tag{1}$$

where $y_0$ may be the one line in both images that is correctly synchronized and $\delta TL$ is:

$$\delta T_L = 2 T_{Ln} - \cdot T_{Lw} \tag{2}$$

where TLn may be the line timing of the narrow camera 120 and TLw may be the line timing of the wide camera 110. Often TLn=TLw and then $\delta TL$ may be the timing of one line (e.g. 1/45,000 sec).

Further, as noted above, if only one line can be synchronized, that line may be chosen based on the requirements of a particular application. For instance, a synchronized line around y=−100 might be advantageous for road surface applications. A row closer to the horizon might be useful for general object detection. Thus, it might be useful to switch the line than is synchronized between two or three (or more) settings, for example: between row y=0 and row y=−100.

In a specific example, assuming two imagers are synchronized to the first imager row, in this case, the center line of the common image (y=0) may be synchronized. If the vertical blanking period of narrow FOV device 120 is 100 lines longer than the wide FOV device 110, in the next frame it will be line y=−100 that may be synchronized. If no changes are made then in the following frame line y=−200 may be synchronized and so forth. This may eventually loop around and with care the line y=0 may again come into synch. If, for example, there are 1000 lines and the vertical blanking is 500 lines then this may happen after 15 frames.

In another instance, the system may have the vertical blanking of the narrow FOV device 120 set to 100 lines fewer than the wide FOV device 110 (for instance, 400 versus 500 lines). This may not be changed but every second frame of the narrow FOV camera 120 would be resynchronized to the wide FOV camera 110. The wide FOV camera 110 may be free running (aka master). In the Aptina 1M Pixel sensor, synchronization may be done using the trigger pin. The trigger pin may be set to '0' after the readout of the second frame (for instance, where y=−100 is synchronized). The trigger pin may be set to '1', N lines prior to readout start from the wide FOV camera 110. N may be determined by the length of integration time set in the narrow FOV camera 120. If N is small, there may be time during the vertical blanking to lower and raise the rigger pin. In night conditions and very long integration times, the narrow FOV camera 120 may have to skip a frame.

In one embodiment, the system may be configured so that correlation of the at least a first area of the first overlap portion of the first image with a corresponding second area of the second overlap portion of the second image includes selection of a first scan line associated with acquisition of the first image to be synchronized with a second scan line associated with acquisition of the second image; and performance of a dense depth map computation in a horizontal strip within the first overlap portion of the first image and within a corresponding region of the second overlap portion of the second image. The system may be configured such that the horizontal strip represents at least 100 pixels in width.

The system may then process different strips of the images for each setting. If processing the whole image every frame might be too computationally expensive, processing optimized strips might represent a viable alternative. In one instance, different strips of the images may then be processed for each setting of Image capture devices 110, 120.

The system may be configured such that correlation of the at least a first area of the first overlap portion of the first image with a corresponding second area of the second overlap portion of the second image includes computation of dense optical flow between the first overlap portion of the first image and the second overlap portion of the second image; and use of the dense optical flow to warp at least one of the first or second images. The system may process the acquired images in order to match object features in the first image against those in the second image in order to establish correspondences. The system may create a disparity map containing depth information for each pixel. Specifically, the disparity map computation may involve combination of information from the imagers 110 and 120. The disparity may represent the distance, typically in pixels, between the x-coordinates of corresponding points in the first image and the second image. For each pixel in the first and/or second image, the disparity map may contain the disparity and the depth information for the image point. The system may generate disparity images at different resolutions.

In one instance, the system may determine depth maps for image capture devices 110 and 120 to obtain depth information relative to objects within a scene. The depth map generated using disparity images at one resolution may be different than those generated from the disparity images at a different resolution. The depth map may be a two-dimensional array of pixels with each pixel value indicating the depth to a point in the scene.

The system may be configured such that the at least one frame from the first plurality of images is warped to achieve synchronization with at least one frame of the second plurality of images. The system may be configured such that the at least one processing device is further configured to preprocess the second image by a homography of a target plane at a predetermined location.

The system may be configured such that correlation of the at least a first area of the first overlap portion of the first image with a corresponding second area of the second overlap portion of the second image includes prewarping at least one of the first image or the second image according to a speed dependent function, the prewarping being achieved by computing a homography matrix associated with motion of the vehicle; and computing a homography associated with skew of lines of at least one of the first image or the second image.

In another embodiment, a solution may be to compute dense optical flow (u, v) between consecutive frames of one of the cameras and then use this flow and warp one of the frames so that each line is what would be expected if it was truly synchronized with the other camera:

$$u(y) = u \frac{yT_L}{T_F} \quad (6)$$

$$v(y) = v \frac{yT_L}{T_F} \quad (7)$$

One embodiment of the system may relate to depth measurements to upright objects, for instance, and may include choosing a line to synchronize and then performing dense depth map computation in a horizontal strip such as ±100 pixels around the line. The selected line may be dependent on vehicle speed. The selected line may also depend on the location of a specific target. The narrow FOV image may be preprocessed by a homography of a target plane to increase the minimum operating depth where the search can be done along the horizontal line. When matching large disparities, corresponding to closer targets, adjacent lines may be searched to determine the matches. The focus of expansion (FOE) may be estimated so as to further allow for small divergence of the epipolar lines. If the FOE is known, it may be possible to solve for distance estimates taking into account the time lag. Where the vehicle moves predominantly in the forward direction, small errors in the FOE may allow for significant correction. Errors may be reduced to below 1 m in almost the whole range. Vehicle rotation may be measured from the Images or from inertial sensors and may be modeled accurately.

In one instance, the system may have a stereo baseline of B=0.06 m, a focal length of wide camera 110 of f=1600 pixels (e.g., a camera with a 6 mm lens and 3.75 um pixel) and a focal length of the narrow camera 120 of 3200 pixels (e.g., 12 mm lens and same pixel). In one configuration, the stereo baseline may be B=dx and dh=dz=0. The narrow FOV image may be captured full frame and subsampled in software reducing the effective focal length to the same 1600 pixel. The wide camera 110 line timing may be: TLw=1/45 msec which may be as fast as the sensor can provide and may produce the minimum time lag inside the frame. In that case, the system could do TLn=TLw.

For a static target at a distance of Z1 the expected disparity may be:

$$d = f * B / Z_1 \quad (8)$$

along the epipolar lines. Assuming the images were rectified these lines may be the Image rows and matching may be a 1 dimensional search. If the host vehicle is moving toward the target at a speed of V the Image points may move away from the focus of expansion (FOE) at a rate of:

$$dx' = (x_1 - x_{ep}) \frac{dZ}{Z_1} \quad (9)$$

$$dy' = (y_1 - y_{ep}) \frac{dZ}{Z_1} \quad (10)$$

where (xep, yep) may be the FOE. However dZ may depend on the image row:

$$dZ(y) = \delta t(y) V = (y_2 - y_1) \delta T_L V \quad (11)$$

The corresponding point (x2, y2) in the second image may now be given as:

$$x_2 = d + dx' + x_1 \quad (12)$$

$$= f * B / Z_1 + (x_1 - x_{ep}) \frac{(y_2 - y_1) \delta T_L V}{Z_1} + x_1 \quad (13)$$

-continued and $$y_2 = dy' + y_1 \quad (14)$$

$$= (y_1 - y_{ep})\frac{(y_2 - y_1)\delta T_L V}{Z_1} + y_1 \quad (15)$$

Here, one may assume yep=0, even though yep may be nonzero. Equation 15 may be solved for y2 as a function of y1:

$$y_2 = \frac{\frac{y_1^2 \delta T_L V}{Z}}{1 + \frac{2y_1 \delta T_L V}{Z}} \quad (16)$$

Due to the distance dependent shift in y, finding correspondences may be more difficult than in the global shutter or static case. Once correspondences are found then the errors in disparity caused by the shift in x may cause significant errors in distance estimates. These problems may be mitigated as discussed in the various embodiments of the present system.

Figure 4:
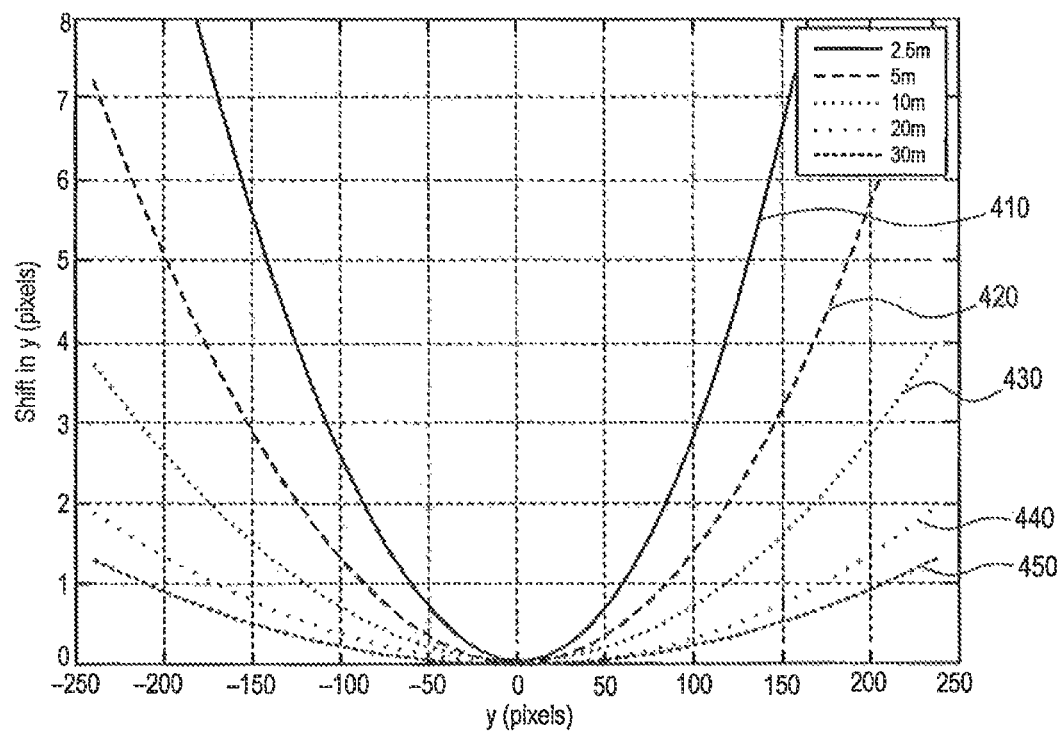
FIG. 4 is an example of displacement of points in the image from the synchronized line for targets at various distances from the vehicle.

FIG. 4 is an example of displacement of points in the Image from the synchronized line for targets at various distances from the vehicle. In one instance, FIG. 4 shows y displacement for targets at various distance values from the vehicle assuming V=30 m/s.

For instance, as shown in FIG. 4, the FOE may be at (xep, yep) of (0,0). Results are shown for y1 values between −250 and 250 pixels for targets at different distances from the vehicle Z, for instance, Z=2.5 m (410), Z=5 m (420), Z=10 m (430), Z=20 m (440) and Z=30 m (450). For each row there may be a fixed displacement in y2 that may depend on V and Z and may be almost quadratic in y1 for small values of:

$$\frac{2_{y1}\delta T_L V}{Z}.$$

The shift in y2 may be positive (or negative, depending on the direction of the rolling shutter). It may not be zero mean.

In one instance, the value y1, which may represent the y coordinate of the target in the first image, may be given. The y coordinate of the corresponding target in the second image may be represented by y2. In a well synchronized and rectified system, y2 may be equal to y1. The corresponding target in the second image may be on the same row. However, due to the forward motion of the image capture devices, the first image and the second image may flow radially out from the FOE. Due to the time difference, the target in the first image may have moved more than the corresponding target in the second image. The outward flow in the first image and the second image may be different and may result in y2 being different from y1.

For targets at a distance of over 10 m, the y2 displacement in the region ±100 pixels from the synchronized line y0 may be less than 1 pixel and search along the epipolar line may work. Beyond that region the displacement may be large and the search may be two dimensional and may depend on the FOE. For instance, for targets at a distance of approximately 5 m, the y2 displacement in the region ±100 pixels from the synchronized line y0 may be close to 1.5 pixels. In another instance, for targets at a distance of approximately 2.5 m, the y2 displacement in the region ±100 pixels from the synchronized line y0 may be close to 2.5-3 pixels.

Figure 5:
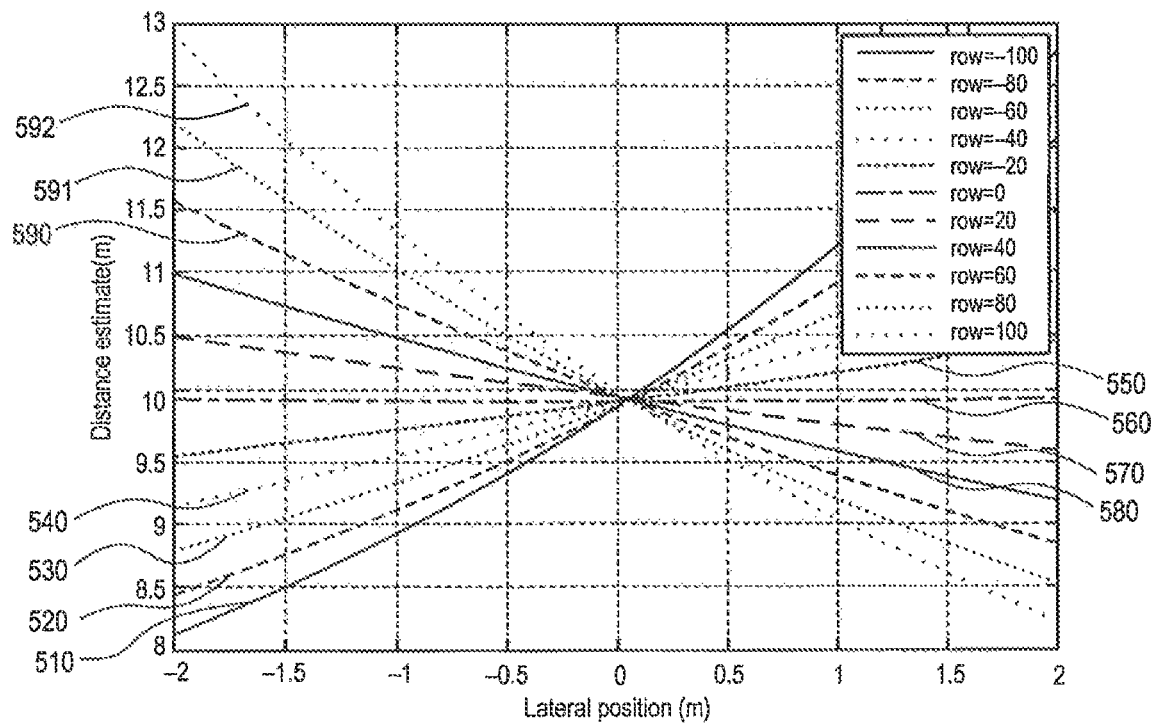
FIG. 5 is an example of depth estimates for a target at a given distance from a vehicle.

FIG. 5 is an example of depth estimates for a target at a given distance from a vehicle. In one instance, FIG. 5 may show depth estimates for a target at 10 m for vehicle forward motion of 30 m/s. Image x position may be translated into lateral distance using the known depth. There may be a significant error in the disparity which similarly depends on row, vehicle velocity and target distance.

In another instance according to FIG. 5, results are shown for horizontal rows between −100 and 100 around the synchronized row (every 20 pixels). For instance, results are shown for horizontal row −100 pixels (510) from the synchronized row; horizontal row 100 pixels (592) from the synchronized row; horizontal row −80 pixels (520) from the synchronized row; horizontal row 80 pixels (591) from the synchronized row; horizontal row −60 pixels (530) from the synchronized row; horizontal row 60 pixels (590) from the synchronized row; horizontal row −40 pixels (540) from the synchronized row; horizontal row 40 pixels (580) from the synchronized row; horizontal row −20 pixels (550) from the synchronized row; horizontal row 20 pixels (570) from the synchronized row; and horizontal row 0 pixels (560).

Figure 6:
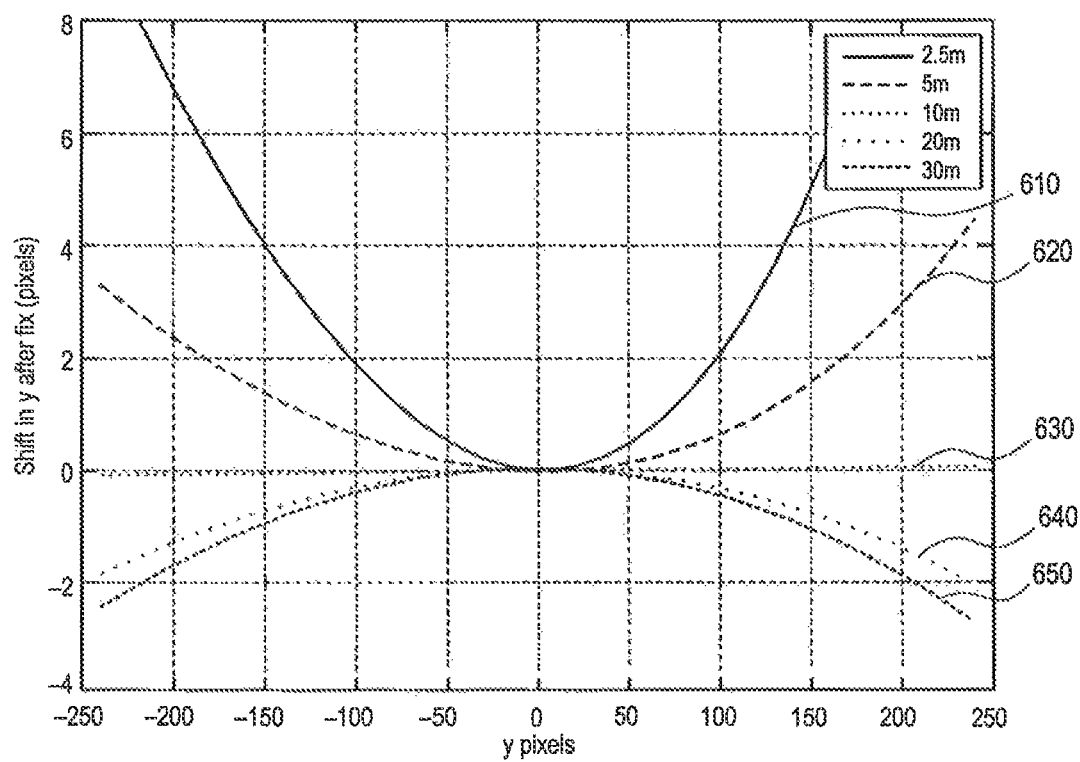
FIG. 6 shows displacement in y for various distance values after a fix involving pre-processing an image with the homography of a target plane.

FIG. 6 shows displacement in y for various distance values after a fix involving pre-processing an Image with the homography of a target plane. In one instance, FIG. 6 shows displacement in y for various distance values assuming V=30 m/s after correcting for plane at 10 m. The shift in y may be approximated by a homography. If the narrow FOV image is preprocessed by a homography for some intermediate distance such as 10 m, then the minimum distance for which the y displacement is less than ±1 pixel may be reduced and/or improved to 5 m.

For instance, for targets at a distance of over 10 m, the y displacement in the region ±100 pixels from the synchronized line y0 may be less than −1 pixel. For targets at a distance of approximately 5 m, the y displacement in the region ±100 pixels from the synchronized line y0 may be less than 1 pixel. In another instance, for targets at a distance of approximately 2.5 m, the y displacement in the region ±100 pixels from the synchronized line y0 may be close to 2 pixels.

Figure 7:
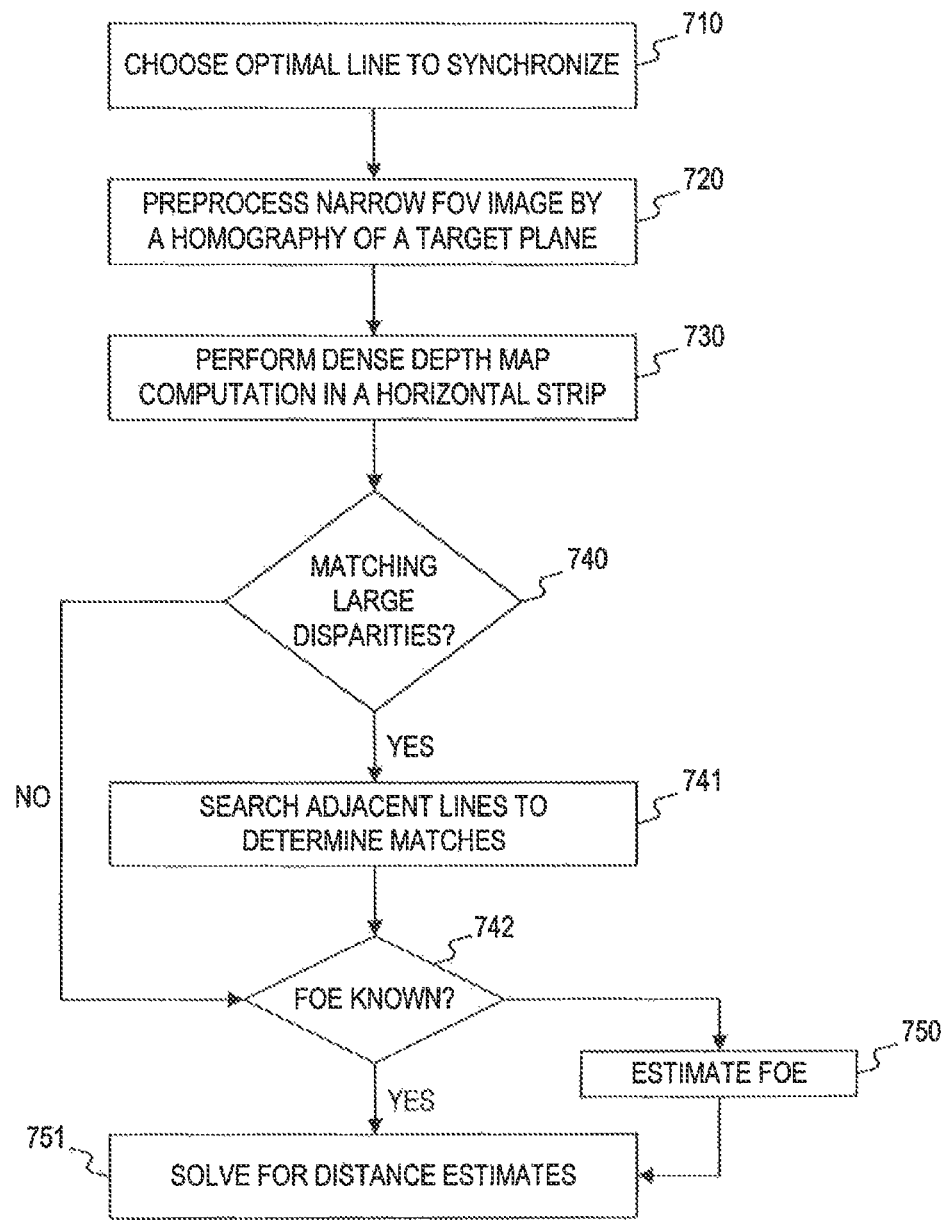
FIG. 7 shows exemplary process for use in systems to perform depth measurements for upright objects.

FIG. 7 shows exemplary process for use in systems to perform depth measurements for upright objects in another embodiment, the system may choose an optimal line to synchronize (step 710).

The narrow FOV image may be preprocessed by a homography of a target plane at 10 m (step 720). This may increase the minimum operating depth where the search can be done along the horizontal line.

The system may then perform dense depth map computation in a horizontal strip such as ±100 pixels around that synchronized line (step 730). For example, one might synchronize image lines corresponding to a line on the road 30 m ahead.

The optimal line might be speed dependent where the system may synchronize lines corresponding to a line on the road 2 seconds ahead. The optimal line might also depend on the location of a specific target.

When matching larger disparities (step 740), corresponding to closer targets, the system may search for matches in adjacent lines (step 741).

The FOE may be estimated so as to further allow for the small divergence of the epipolar lines (step 750). The process may not be very sensitive to small errors in detecting the epipole.

If the FOE is known it may be possible to solve equation 13 for Z taking in to account the time lag (step 751). Since the vehicle motion may be predominantly in the forward direction, small errors in the FOE, or even taking xep=0, may allow for significant correction.

Figure 8A:
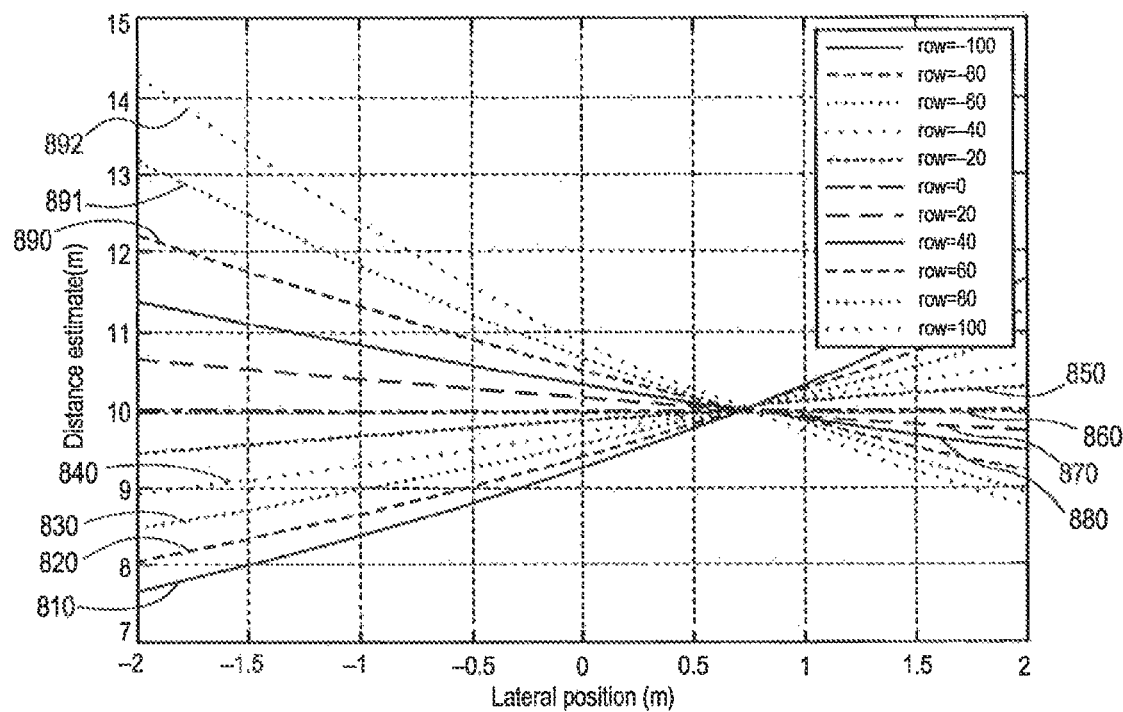
FIG. 8a shows depth estimates for a target at a given distance from the vehicle for a given vehicle forward motion and lateral velocity.

FIG. 8*a* shows depth estimates for a target at a given distance from the vehicle for a given vehicle forward motion and lateral velocity. For instance, FIG. 8*a* may show an example of depth estimates for a target at 10 m for vehicle forward motion of 30 m/s and lateral velocity of Vx=2 m/s.

In an instance according to FIG. 8*a*, results are shown for horizontal rows between −100 and 100 around the synchronized row (every 20 pixels). For instance, results are shown for horizontal row −100 pixels (810) from the synchronized row; horizontal row 100 pixels (892) from the synchronized row; horizontal row −80 pixels (820) from the synchronized row; horizontal row 80 pixels (891) from the synchronized row; horizontal row −60 pixels (830) from the synchronized row; horizontal row 60 pixels (890) from the synchronized row; horizontal row −40 pixels (840) from the synchronized row; horizontal row 40 pixels (880) from the synchronized row; horizontal row −20 pixels (850) from the synchronized row; horizontal row 20 pixels (870) from the synchronized row; and horizontal row 0 pixels (860).

Figure 8B:
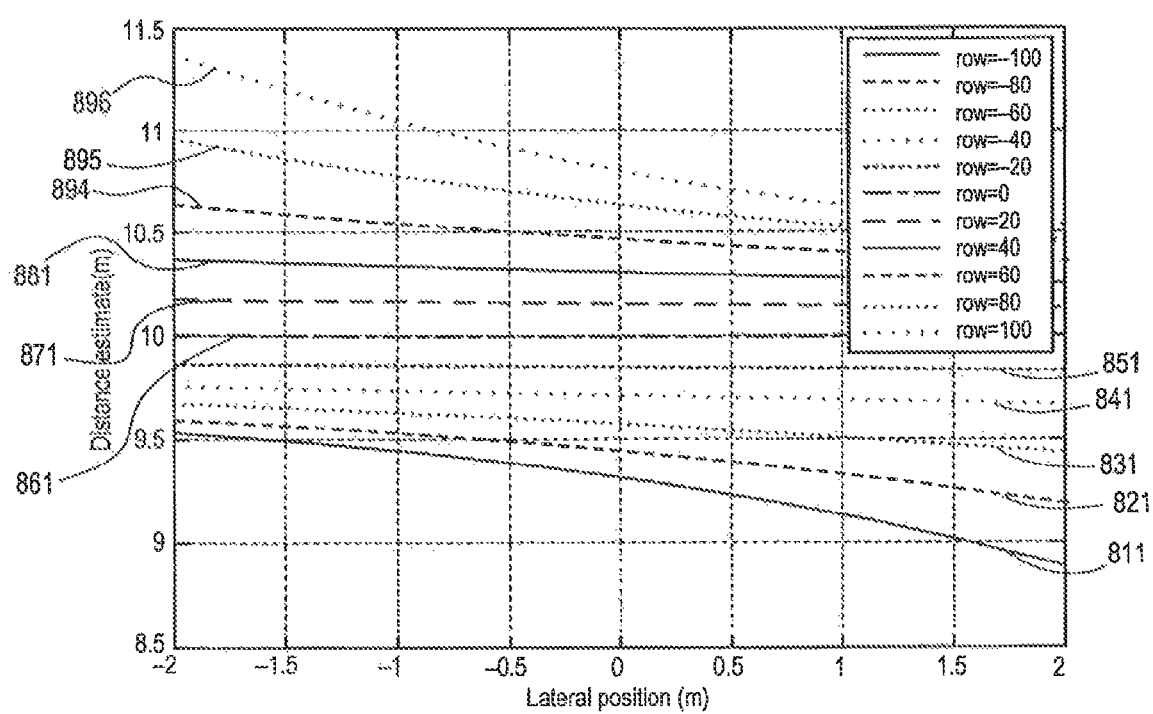
FIG. 8b shows corrected depth estimates for forward vehicle motion and no lateral velocity.

FIG. 8*b* shows corrected depth estimates for forward vehicle motion and no lateral velocity. In one instance, FIG. 8*b* may show depth estimates corrected assuming forward motion only (for instance, assuming Vx=0). Errors may be reduced to below 1 m in almost the whole range.

In an instance according to FIG. 8*b*, results are shown for horizontal rows between −100 and 100 around the synchronized row (every 20 pixels). For instance, results are shown for horizontal row −100 pixels (811) from the synchronized row; horizontal row 100 pixels (896) from the synchronized row; horizontal row −80 pixels (821) from the synchronized row; horizontal row 80 pixels (895) from the synchronized row; horizontal row −60 pixels (831) from the synchronized row; horizontal row 60 pixels (894) from the synchronized row; horizontal row −40 pixels (841) from the synchronized row; horizontal row 40 pixels (881) from the synchronized row; horizontal row −20 pixels (851) from the synchronized row; horizontal row 20 pixels (871) from the synchronized row; and horizontal row 0 pixels (861).

In another aspect, vehicle rotation may be measured from the images or from inertial sensors and may be modeled accurately. The narrow FOV image, for example, may then be corrected. Yaw may cause horizontal skew. Pitch may cause vertical compression or elongation around the synchronized line.

Another embodiment of the system may relate to estimation of distances to road features and may include prewarping the narrow FOV image according to a speed dependent function. A more general approach may involve (1) computing the homography matrix due to the motion of the vehicle over the road plane per line timing; (2) for each line, computing homography for that line's skew; and (3) warping that line according to the line's homography. Each line's homography may be approximated by (1) computing a homography matrix for the time difference between one frame and the next, (2) computing the Image motion due to the homography and (3) for each line, warping with a fraction of that motion depending on the time skew. The homography matrix may also be estimated directly from two consecutive narrow FOV images. A correction may be needed and may be performed as described other embodiments. Improved performance on the road surface estimation may be obtained by optimizing the image row which is synchronized.

In one instance, the two cameras may be mounted near the rearview mirror at 1.25 m above the road surface. The vehicle speed may be 30 m/s. Due to the forward motion of the car, points on the road in the image may experience a downward and outward flow. The magnitude of the flow may increase with the time difference and inversely with the distance to the road surface at that point. The latter distance may be inversely proportional to the image row:

$$Z = \frac{-Hf}{y} \quad (17)$$

Figure 9:
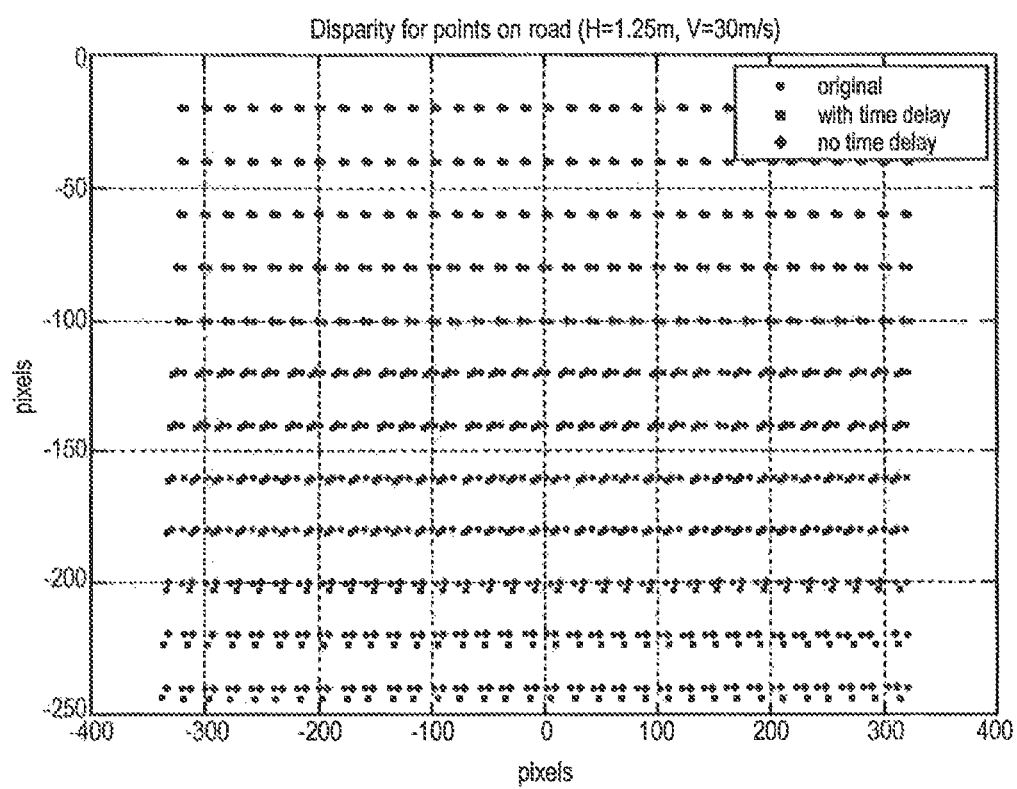
FIG. 9 is an example of the disparity expected on the road surface due to the camera baseline.

FIG. 9 shows the disparity expected on the road surface due to the camera baseline with no time delay and with time delay. In particular, FIG. 9 shows a simulation of stereo disparity for a road surface: original points in wide angle camera, matching coordinates in narrow camera assuming static scene and actual location due to time delay and forward motion. The time delay may increase linearly from the synchronized line y=0.

Figure 10:
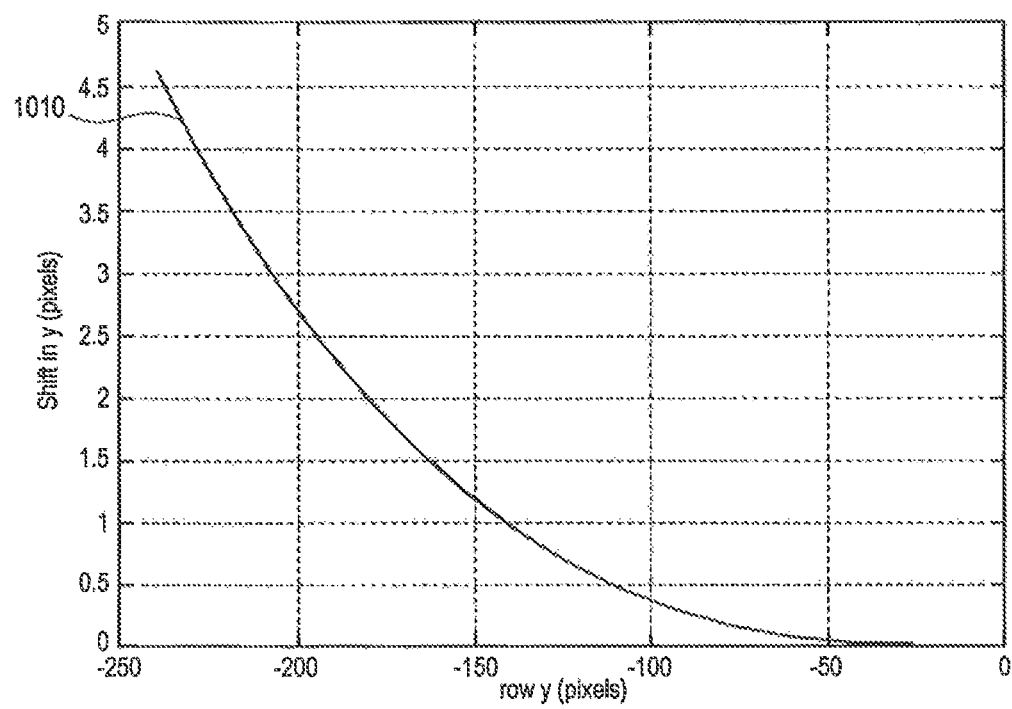
FIG. 10 is an example of the shift in the y direction as a function of the image row.

FIG. 10 shows the shift in the y direction, due to time delay and forward motion, as a function of the image row (curve 1010). Curve 1010 may be a cubic function. The y shift may be very small (under 0.5 pixels) down to row y=−100 which may be 19 m ahead. Below row y−100, the system may need to make some adjustment in the search space For instance, between row 0 to row −124, the system may search for the target centered on (x1,y1) along row (y2=y1); between row −125 and row −170, the system may search one row down (e.g. y2=y1−1); between row −170 and row −190, the system may search two rows down (e.g. y2=y1−2); between row −190 to −220, the system may search three rows down and so on.

In another instance, instead of switching the search row, the system may warp the second image according to the function in FIG. 10. The warping may involve compression and/or rectification (e.g. rectification similar to the global shutter case) of the second image. To reduce the number of warping functions and the image blurring that may accompany warping, the two warps may be combined into a single mapping. The warping of the second image may give relatively smooth transitions.

Figure 11:
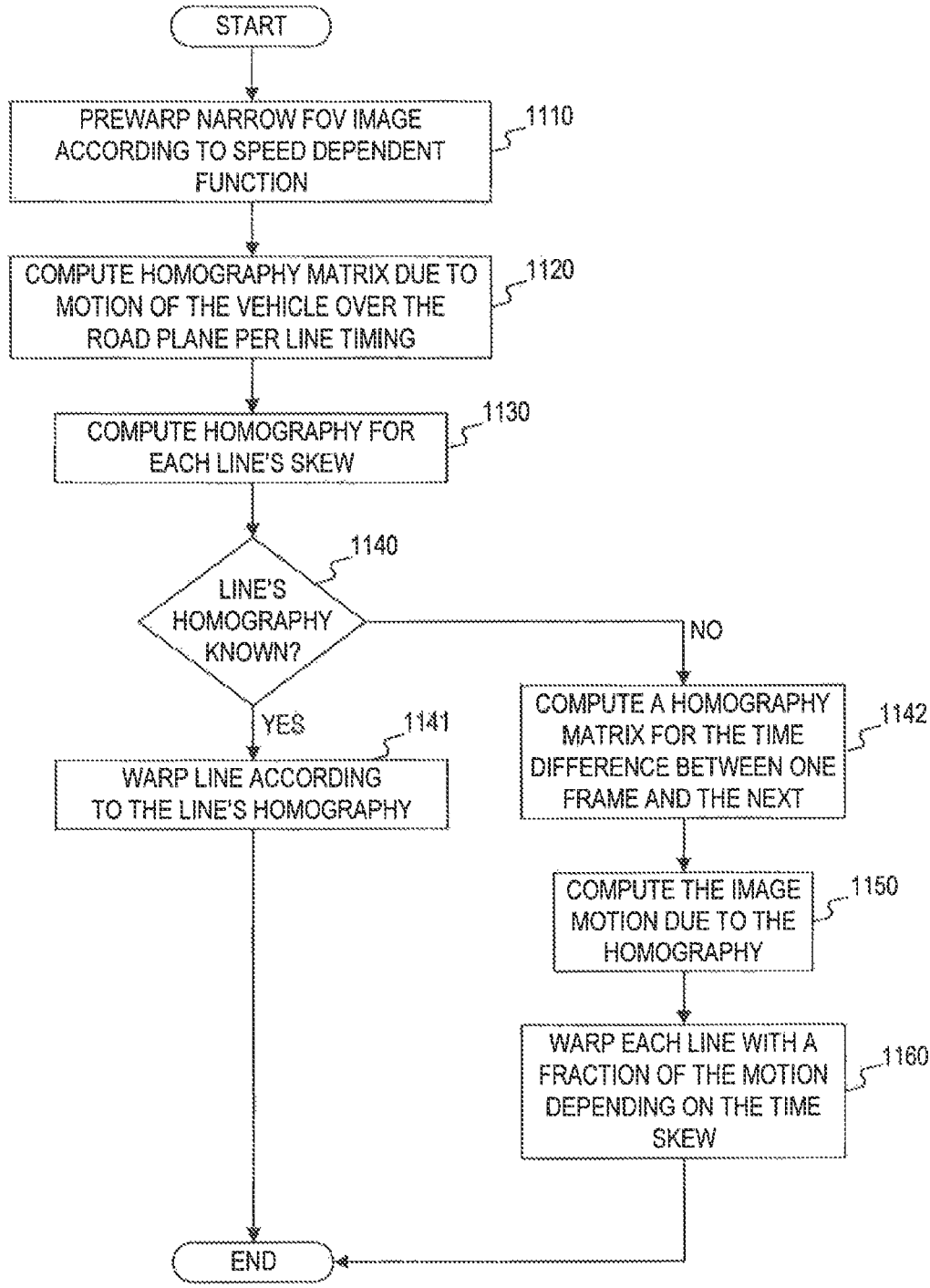
FIG. 11 shows exemplary process for use in systems to estimate distances to road features.

FIG. 11 shows exemplary process for use in systems to estimate distances to road features. For instance, in one solution, the processor 130 may prewarp the narrow image vertically according to the speed dependent y shift function (step 410). There may be an advantage to prewarp assuming a specific distance such as 10 m.

A more general approach may be for the processor 130 to compute the homography matrix Hπ due to the motion of the vehicle over the road plane per line timing $T_L$ (step 420):

$$H_{TT}(T_L) = K\left(R^{-1} + \frac{T'\vec{N}'^T}{d'_\pi}\right)K'^{-1} \quad (18)$$

where R and T are the translation and rotation matrices for motion in time $T_L$ (taken for example from inertial sensors and speedometer). In theory the plane normal N may also be modified by R each line step. The approach may then involve the processor 130 computing, for each line, homography for that line's skew (step 430):

$$H_\pi(y) = H_\pi(T_L)^y \quad (19)$$

The approach may then involve the processor 130 warping that line according to homography for that line (step 441). The processor 130 may approximate the homography for a line by computing a homography matrix for the time difference between one frame and the next (step 442), computing the Image motion due to the homography (step 450) and then for each line, warp with a fraction of that motion depending on the time skew (step 460). The processor 130 may also estimate the homography matrix directly from two consecutive narrow FOV images.

Figure 12A:
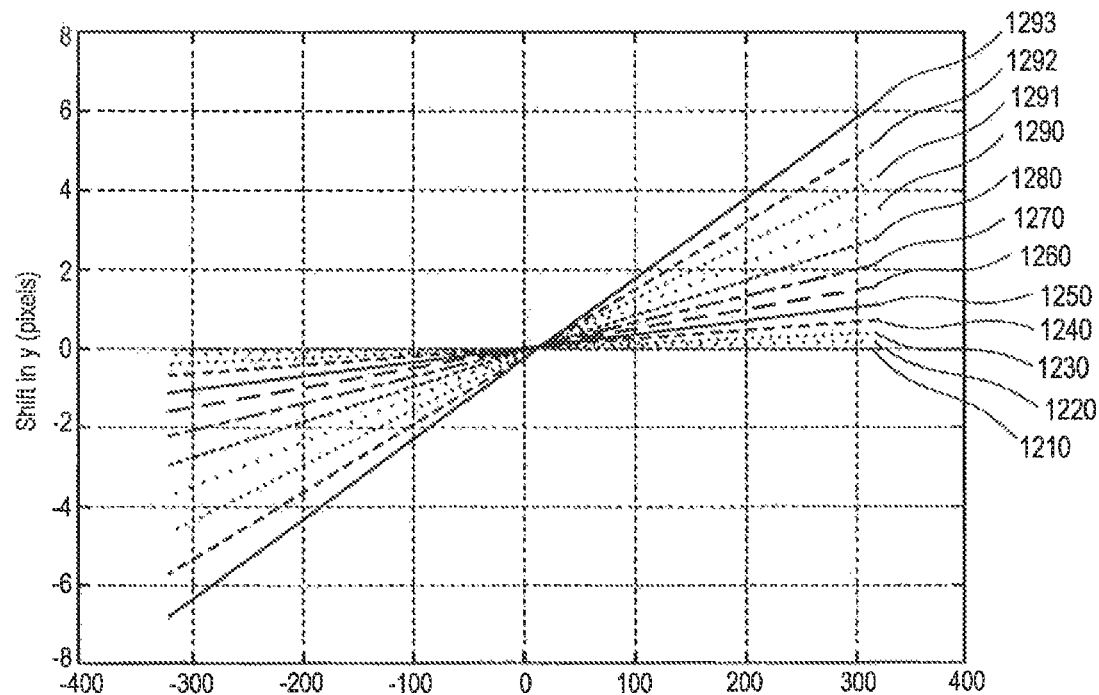
FIG. 12a is an example of the disparity error for different rows in the Image introduced by the vehicle forward motion and the time delay.

FIG. 12a shows the disparity error for different rows in the image introduced by the vehicle forward motion and the time delay. In particular, the figure shows the error in disparity due to time delay for images rows starting at −20 (almost zero) to −240 (errors above 6 pixels at image edges) every 20 pixels. For instance, results are shown for horizontal row −20 pixels (1210); horizontal row −40 pixels (1220); horizontal row −60 pixels (1230); horizontal row −80 pixels (1240); horizontal row −100 pixels (1250); horizontal row −120 pixels (1260); horizontal row −140 pixels (1270); horizontal row −160 pixels (1280); horizontal row −180 pixels (1290); horizontal row −200 pixels (1291); horizontal row −220 pixels (1292); and horizontal row −240 pixels (1293).

Figure 12B:
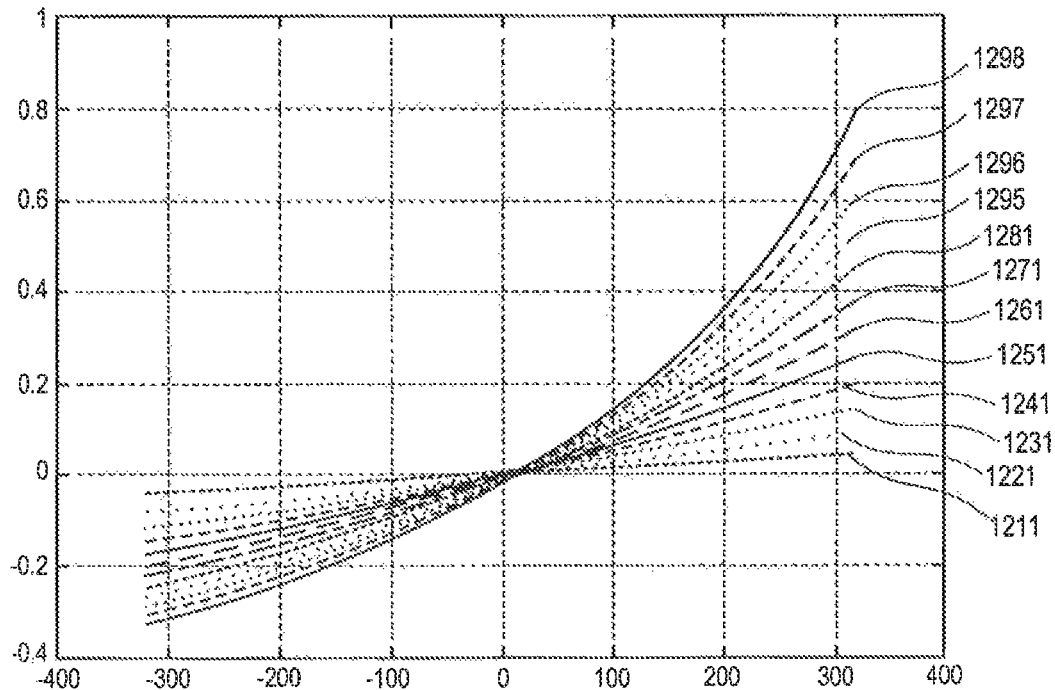
FIG. 12b is an example of the disparity error as a fraction of the disparity on that row.

FIG. 12b shows the disparity error as a fraction of the disparity on that row (that is, true disparity). To get improved results, a correction may be needed and may be performed to the disparities as described in other embodiments. Improved performance on the road surface estimation may be obtained by optimizing the image row which may be synchronized. For instance, results are shown for horizontal row −20 pixels (1211); horizontal row −40 pixels (1221); horizontal row −80 pixels (1231); horizontal row −80 pixels (1241); horizontal row −100 pixels (1251); horizontal row −120 pixels (1261); horizontal row −140 pixels (1271); horizontal row −160 pixels (1281); horizontal row −180 pixels (1295); horizontal row −200 pixels (1296); horizontal row −220 pixels (1297); and horizontal row −240 pixels (1298).

Figure 13:
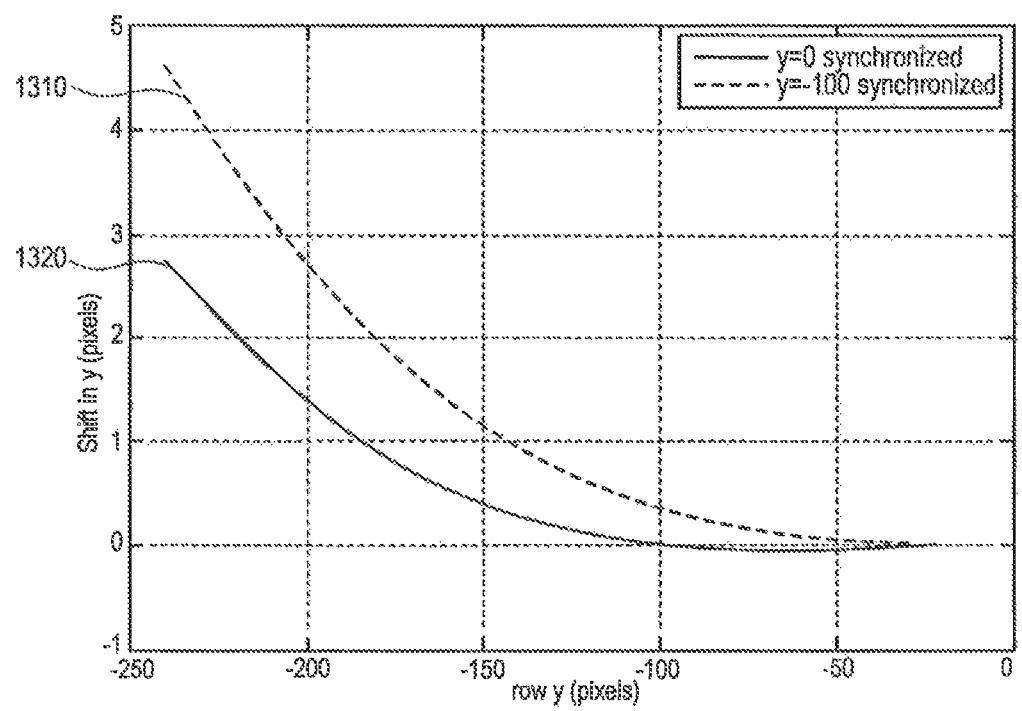
FIG. 13 is an example of the expected y shift due to time delay and forward motion if a given row is synchronized.

FIG. 13 is an example of the expected y shift due to time delay and forward motion if a given row is synchronized. In one instance, FIG. 13 shows the expected y shift due to time delay and forward motion if row −100 is synchronized (curve 1320) and the expected shift due to time delay and forward motion if row 0 is synchronized (curve 1210). Row −100 may correspond to a line on the row about 20 m in front of the car. Picking such a row may have advantages. First, the region where the y-shift is below 0.5 pixels may increase down to −150. Secondly, given that row −100 may now be perfectly synchronized, the distance measure to this row may be accurate and this may provide a good estimate of the vehicle pitch relative to the road plane. This may be used to improve the prewarp in vertical direction and also to improve the x disparity correction.

In one instance, the Image warp may be based on the equation Z=f*H/(y−y0). Where the horizon (y0) is assumed to be at line y=0, Z=f*H/y. If y0 is known, the system can solve for y'=y−y0 and then solve for Z=f*H/y'. In other instances, y0 may not be known and may vary between frames due to, for instance, vehicle pitch movement. In such cases, y0 can be estimated using the distance Z100 at row −100 using the disparity: (y100−y0)=H/Z100, or y0=y100−f*H/Z100. The adjusted y0 may give a better correction warp, and therefore, a better x-disparity correction.

Another embodiment may relate to laterally moving objects or motion disparity from any source and may include error reduction by using multiple frames. In general, the lateral disparity may be split into the true disparity as one would measure on a static scene and disparity due to motion. The motion disparity may be approximately linear with the time skew between the rows in the narrow and wide FOV cameras. The lateral disparity at two different known times may provide two linear equations in the two unknowns (motion disparity and true disparity) and may be solved to provide true disparity. The two samples may be obtained between, for instance, a feature on an object viewed in the wide FOV image and the same feature on the object viewed in the narrow FOV camera in two different frames. The two samples may also be obtained from two points on the object on different rows where we expect the same depth for those points. A variant of this method may involve computing the optical flow of a feature or dense flow between two images from the same camera.

In one instance, an object moving laterally at a speed Vx may introduce an error dvx to the static disparity due to baseline dB. The total disparity value may be equal to:

$$d = d_B + d_{V_x} = \frac{fB}{Z} + \frac{\delta t(y)V_x}{Z} = \frac{fB}{Z} + \frac{f y \delta T_L V_x}{Z} \quad (20)$$

Depth accuracy may be related to the ratio:

$$\frac{d_{V_x}}{d_B} = \frac{y \delta T_L V_x}{B} \quad (21)$$

The error may be constant along the row and linear in row distance from the synchronized row.

Figure 14A:
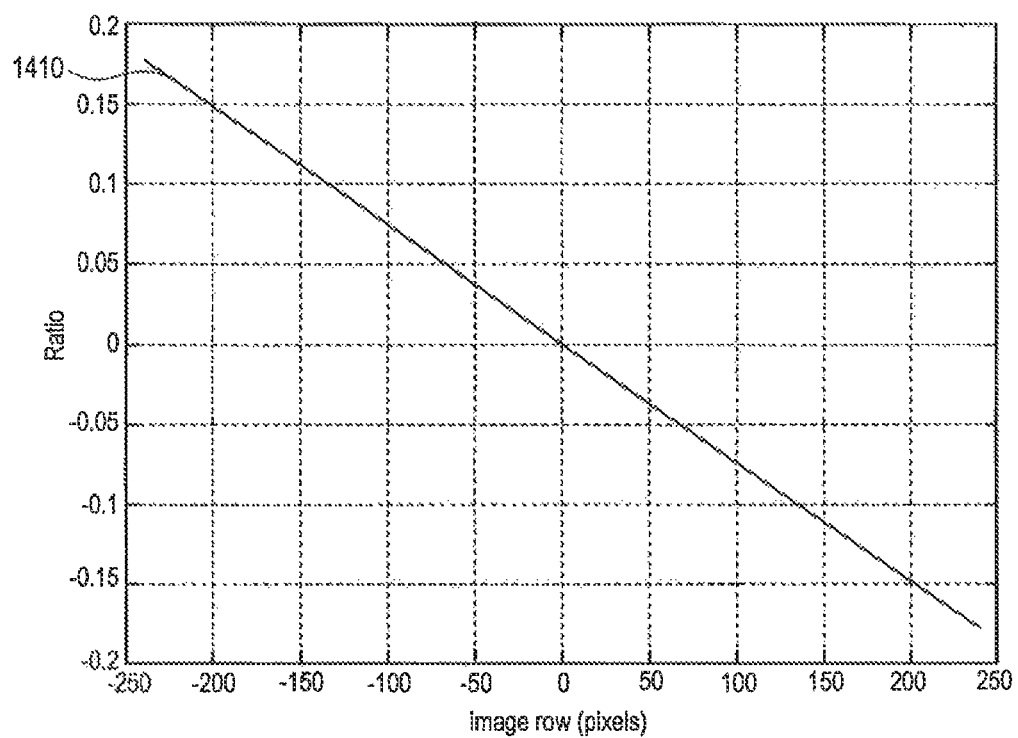
FIG. 14a is an example of the ratio of disparity error due to motion over true disparity due to baseline as a function of row (y)

For validation of slow moving targets, the errors in disparity may not be large. FIG. 14a is an example of the ratio of disparity error due to motion over true disparity due to baseline as a function of row (y). In one instance, FIG. 14a shows the ratio (of disparity error due to motion over true disparity due to baseline) as a function of row (y) for the case where the object is moving laterally at 2 m/s (slow run) and a baseline of 0.06 m (curve 1410). The error ratio may be the expected error in depth and may reach a maximum of about 15% at the top and bottom of the image. This might be considered acceptable for the application. In any case, a pedestrian may typically be in the central region where the error may be considerably less.

Figure 14B:
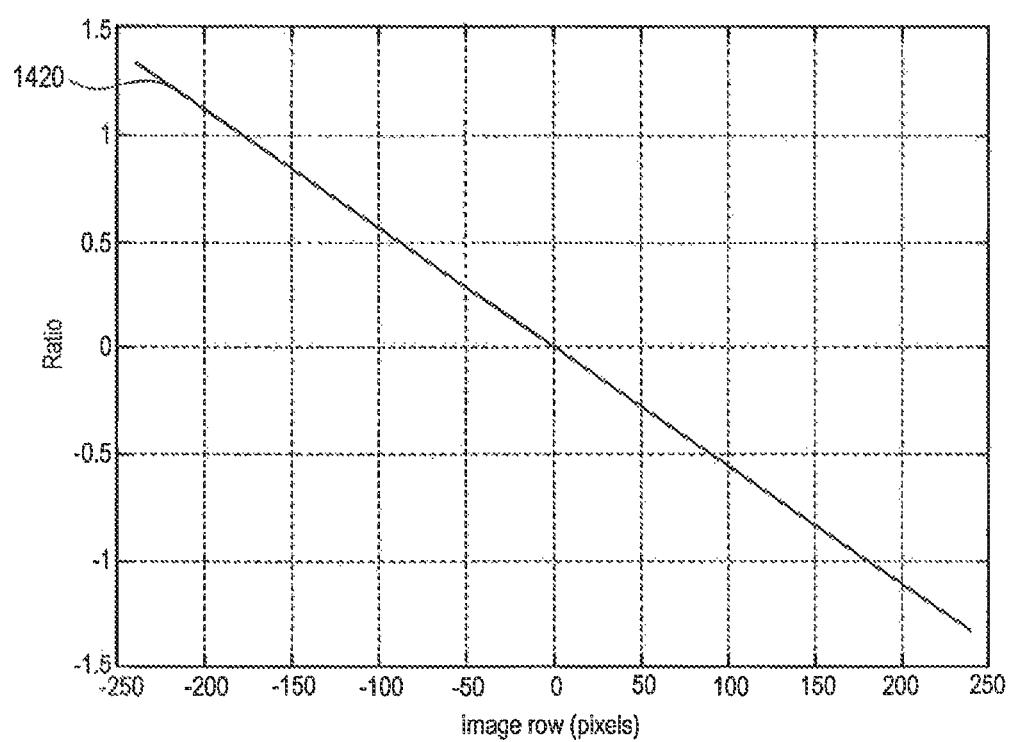
FIG. 14b is an example of the ratio of disparity error due to motion over true disparity due to baseline for the case where the object is moving laterally.

For the validation of fast moving targets, a method is described to give accurate results using multiple frames. FIG. 14b is an example of the ratio of disparity error due to motion over true disparity due to baseline for the case where the object is moving laterally. In one instance, FIG. 14b shows the ratio of disparity error due to motion over true disparity due to baseline for the case where the object is moving laterally at 15 m/s (for instance, a car crossing at 50 kmh) (curve 1420). The ratio may be above 20% in all but a narrow strip. The error may be significantly reduced by using multiple frames.

Figure 15:
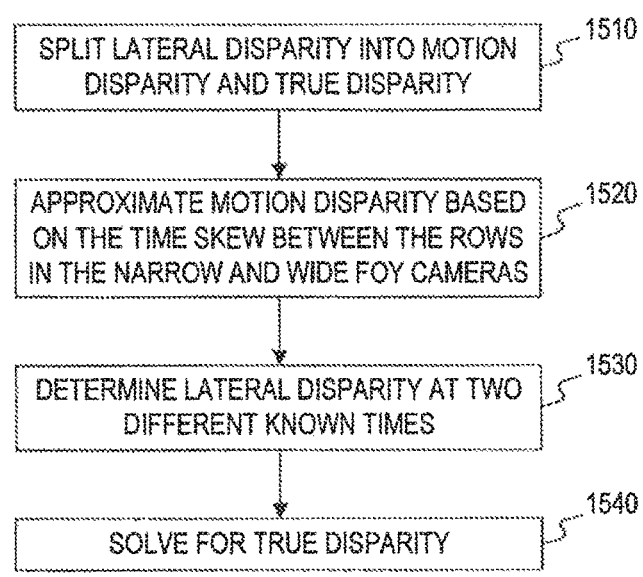
FIG. 15 shows an exemplary process for use in systems where there is motion disparity.

FIG. 15 shows exemplary process for use in systems where there is motion disparity. In general, the lateral disparity may be split into the true disparity as one would measure on a static scene and disparity due to motion, either of the host vehicle or the object (step 510). The disparity due to motion may be approximately linear with the time skew between the rows in the narrow FOV camera 120 and wide FOV camera 110 (step 520). The lateral disparity at two different (known) times may provide two linear equations in the two unknowns, true disparity and motion disparity, (step 530) and may be solved to provide the true disparity (step 540). The two samples may be obtained between, for example, a feature on an object viewed in the wide FOV image and the same feature on the object viewed in the narrow FOV camera in two different frames. The two samples may also be obtained from two points on the object on different rows where we expect the same depth for those points such as the edge of a vertical pole. A variant of this method may be to compute the optical flow (u) of a feature or dense flow between two images from the same camera. The motion disparity may then be determined by:

$$d_{V_x} = \frac{y \delta T_L u}{T_F} \tag{22}$$

where TF is the time of one full frame including blanking. It should be noted that this may be approximately true not only for laterally moving objects but motion disparity from any source.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An imaging system for a vehicle, the system comprising:
a first image capture device having a first field of view and configured to acquire a first image relative to a scene associated with the vehicle, the first image being acquired as a first series of image scan lines captured using a rolling shutter; and
a second image capture device having a second field of view different from the first field of view and that at least partially overlaps the first field of view, the second image capture device being configured to acquire a second image relative to the scene associated with the vehicle, the second image being acquired as a second series of image scan lines captured using a rolling shutter;
wherein, as a result of overlap between the first field of view and the second field of view, a first overlap portion of the first image corresponds with a second overlap portion of the second image; and
wherein the first image capture device has a first scan rate associated with acquisition of the first series of image scan lines that is different from a second scan rate associated with acquisition of the second series of image scan lines, such that the first image capture device acquires the first overlap portion of the first image over a period of time during which the second overlap portion of the second image is acquired.

2. The system of claim 1, wherein the second scan rate is greater than the first scan rate.

3. The system of claim 1, further including an image processing device configured to sample only a subset of scan lines from the second image capture device within the second overlap portion of the second image.

4. The system of claim 1, wherein:
the first image capture device has a first horizontal blanking period associated with acquisition of the first series of image scan lines;
the second image capture device has a second horizontal blanking period associated with acquisition of the second series of image scan lines; and
the second horizontal blanking period is less than the first horizontal blanking period.

5. The system of claim 1, wherein:
the first image capture device has a first vertical blanking period associated with acquisition of the first series of image scan lines;
the second image capture device has a second vertical blanking period associated with acquisition of the second series of image scan lines; and
the first vertical blanking period is less than the second vertical blanking period.

6. The system of claim 1, wherein:
the first image capture device has a first total frame time associated with acquisition of the first series of image scan lines;
the second image capture device has a second total frame time associated with acquisition of the second series of image scan lines; and
wherein the first total frame time is equal to the second total frame time.

7. The system of claim 1, wherein the second field of view is narrower than the first field of view.

8. The system of claim 1, wherein at least a center of the second field of view substantially corresponds to at least a center the first field of view.

9. The system of claim 1, wherein the system further comprises:
at least one processing device configured to:
perform a periodic check to determine whether the first image capture device and the second image capture device are synchronized.

10. The system of claim 9, wherein the at least one processing device is further configured to perform resynchronization of the first image capture device and the second image capture device if the periodic check indicates that the first image capture device and the second image capture device have fallen out of synch.

11. The system of claim 1, wherein:
the first image capture device has a first pixel delay associated with acquisition of the first series of image scan lines;
the second image capture device has a second pixel delay associated with acquisition of the second series of image scan lines; and
the first pixel delay is more than the second pixel delay.

12. The system of claim 1, wherein at least one of the first series of image scan lines is aligned with at least one of the second series of image scan lines.

13. The system of claim 1, further comprising a processing device configured to periodically perform a timing check to determine whether the first image capture device and the second image capture device are synchronized.

14. The system of claim 1, further comprising a processing device configured to periodically reset a scan line of the first series of image scan lines or the second series of image scan lines.

15. A method for acquiring images from a scene associated with a vehicle, the method comprising:
acquiring, via a first image capture device having a first field of view, a first image relative to the scene associated with the vehicle, the first image being acquired as a first series of image scan lines captured using a rolling shutter;

acquiring, via a second image capture device having a second field of view different from the first field of view and that at least partially overlaps the first field of view, a second image relative to the scene associated with the vehicle, the second image being acquired as a second series of image scan lines captured using a rolling shutter;

wherein, as a result of overlap between the first field of view and the second field of view, a first overlap portion of the first image corresponds with a second overlap portion of the second image; and wherein the first image capture device has a first scan rate associated with acquisition of the first series of image scan lines that is different from a second scan rate associated with acquisition of the second series of image scan lines, such that the first image capture device acquires the first overlap portion of the first image over a period of time during which the second overlap portion of the second image is acquired.

16. The method of claim 15, wherein the second scan rate is greater than the first scan rate.

17. The method of claim 15, wherein the second field of view is narrower than the first field of view.

18. An imaging system for a vehicle, the system comprising:

a first image capture device having a first field of view and configured to acquire a first image, the first image being acquired as a first series of image scan lines captured using a rolling shutter; and a second image capture device having a second field of view different from the first field of view and that at least partially overlaps the first field of view, the second image capture device being configured to acquire a second image, the second image being acquired as a second series of image scan lines captured using a rolling shutter;

wherein the first image capture device has a first scan rate associated with acquisition of the first series of image scan lines that is different from a second scan rate associated with acquisition of the second series of image scan lines, such that the first image capture device acquires the first overlap portion of the first image over a period of time during which the second overlap portion of the second image is acquired.

19. The imaging system of claim 18, wherein, as a result of overlap between the first field of view and the second field of view, a first overlap portion of the first image corresponds with a second overlap portion of the second image.

* * * * *